United States Patent  (10) Patent No.: US 7,509,861 B2
Masotti et al. (45) Date of Patent: Mar. 31, 2009

(54) METHOD AND DEVICE FOR LOCAL SPECTRAL ANALYSIS OF AN ULTRASONIC SIGNAL

(75) Inventors: Leonardo Masotti, Florence (IT); Elena Biagi, Florence (IT); Simona Granchi, Arezzo (IT); Luca Breschi, Prato (IT)

(73) Assignees: Actis Active Sensors S.r.l., Florence (IT); Esaote S.p.A., Milan (IT)

( * ) Notice: Subject to any disclaimer, the term of this patent is extended or adjusted under 35 U.S.C. 154(b) by 416 days.

(21) Appl. No.: 10/595,336

(22) PCT Filed: Oct. 5, 2004

(86) PCT No.: PCT/IT2004/000548

§ 371 (c)(1),
(2), (4) Date: Apr. 10, 2006

(87) PCT Pub. No.: WO2005/033738

PCT Pub. Date: Apr. 14, 2005

(65) Prior Publication Data

US 2006/0277998 A1    Dec. 14, 2006

(30) Foreign Application Priority Data

Oct. 8, 2003    (IT) .............................. FI2003A0254

(51) Int. Cl.
G01N 29/46 (2006.01)
A61B 8/00 (2006.01)
G06K 9/20 (2006.01)

(52) U.S. Cl. .............................. 73/659; 73/602; 73/579; 600/442; 600/443; 382/128; 382/280

(58) Field of Classification Search ................... 73/579, 73/602, 659, 649; 600/442, 443; 382/128, 382/132, 274, 276, 280

See application file for complete search history.

(56) References Cited

U.S. PATENT DOCUMENTS

| 4,187,462 | A |   | 2/1980 | Haker et al. |
| 5,133,208 | A |   | 7/1992 | Ricci |
| 5,229,716 | A | * | 7/1993 | Demoment et al. ......... 324/307 |
| 5,914,272 | A |   | 6/1999 | Dufresne et al. |
| 5,935,074 | A | * | 8/1999 | Mo et al. ..................... 600/454 |
| 6,066,098 | A |   | 5/2000 | Masotti et al. |
| 6,081,612 | A | * | 6/2000 | Gutkowicz-Krusin et al. .......................... 382/128 |
| 6,190,615 | B1 |  | 2/2001 | Cocola et al. |

(Continued)

FOREIGN PATENT DOCUMENTS

EP    0898700    3/1999

(Continued)

*Primary Examiner*—Hezron Williams
*Assistant Examiner*—J M Saint Surin
(74) *Attorney, Agent, or Firm*—McGlew and Tuttle, P.C.

(57) ABSTRACT

The method decomposes the radio frequency signal into sub-bands by filtering, for example with a time-frequency transform. From the coefficients acquired through decomposition a matrix of spectral coefficients is obtained, from which local estimators are obtained, constituted in particular by the coefficients of the interpolating polynomials. The statistical distribution of the local estimators is evaluated in windows overlaid on the ultrasound frame. The conformation of the distribution histograms of the spectral coefficients provides a parameter which, combined with the local estimators, provides weighted local estimators, which contain spectral information useful in the identification of specific structures in the organ subjected to ultrasound analysis.

26 Claims, 29 Drawing Sheets

U.S. PATENT DOCUMENTS

| | | |
|---|---|---|
| 6,251,077 B1 * | 6/2001 | Mo et al. .................... 600/455 |
| 6,403,328 B1 | 6/2002 | Clampitt |
| 6,523,003 B1 * | 2/2003 | Chandran et al. ........... 704/225 |
| 6,839,003 B2 * | 1/2005 | Soliman et al. ............... 341/50 |
| 6,839,666 B2 * | 1/2005 | Chandran et al. ........... 704/226 |
| 2003/0087443 A1 | 5/2003 | Pressman et al. |
| 2003/0113930 A1 | 6/2003 | Winkelman et al. |
| 2003/0135364 A1 * | 7/2003 | Chandran et al. ........... 704/226 |

FOREIGN PATENT DOCUMENTS

| | | |
|---|---|---|
| EP | 1341003 | 9/2003 |
| WO | WO91/09295 | 6/1991 |
| WO | WO97/43621 | 11/1997 |
| WO | WO97/43622 | 11/1997 |
| WO | WO98/02726 | 1/1998 |

* cited by examiner

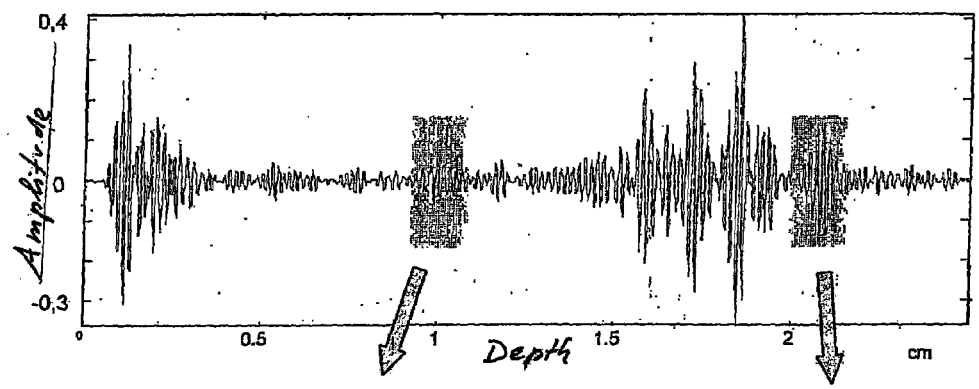
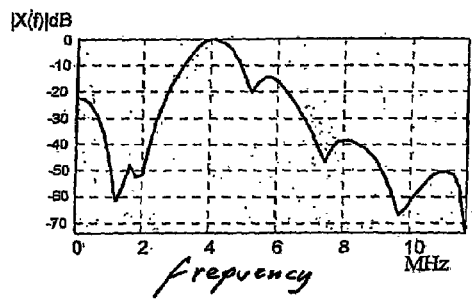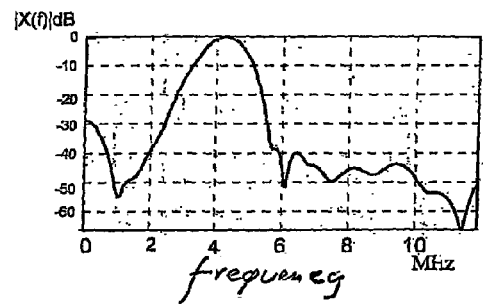
Fig. 4

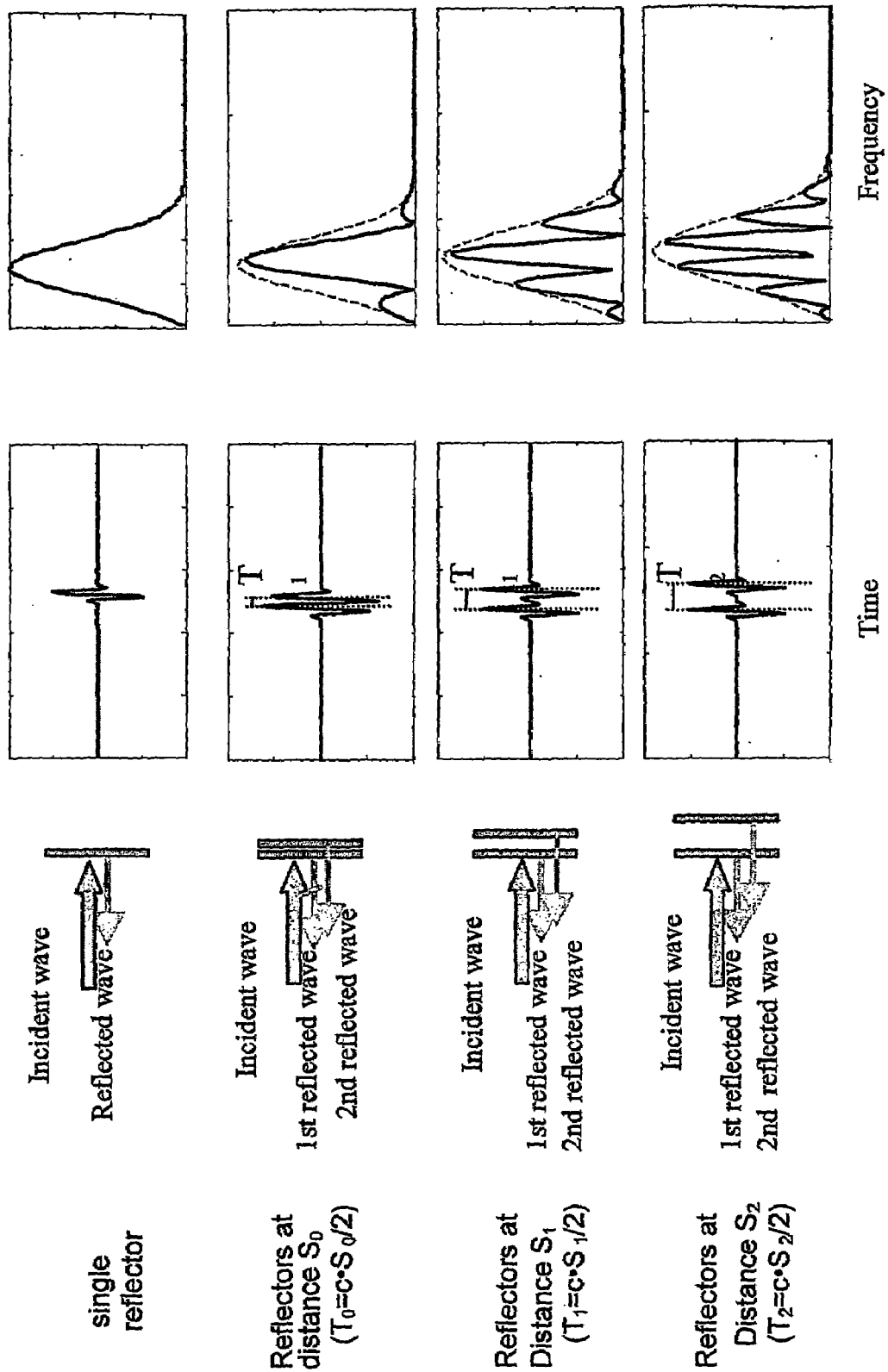

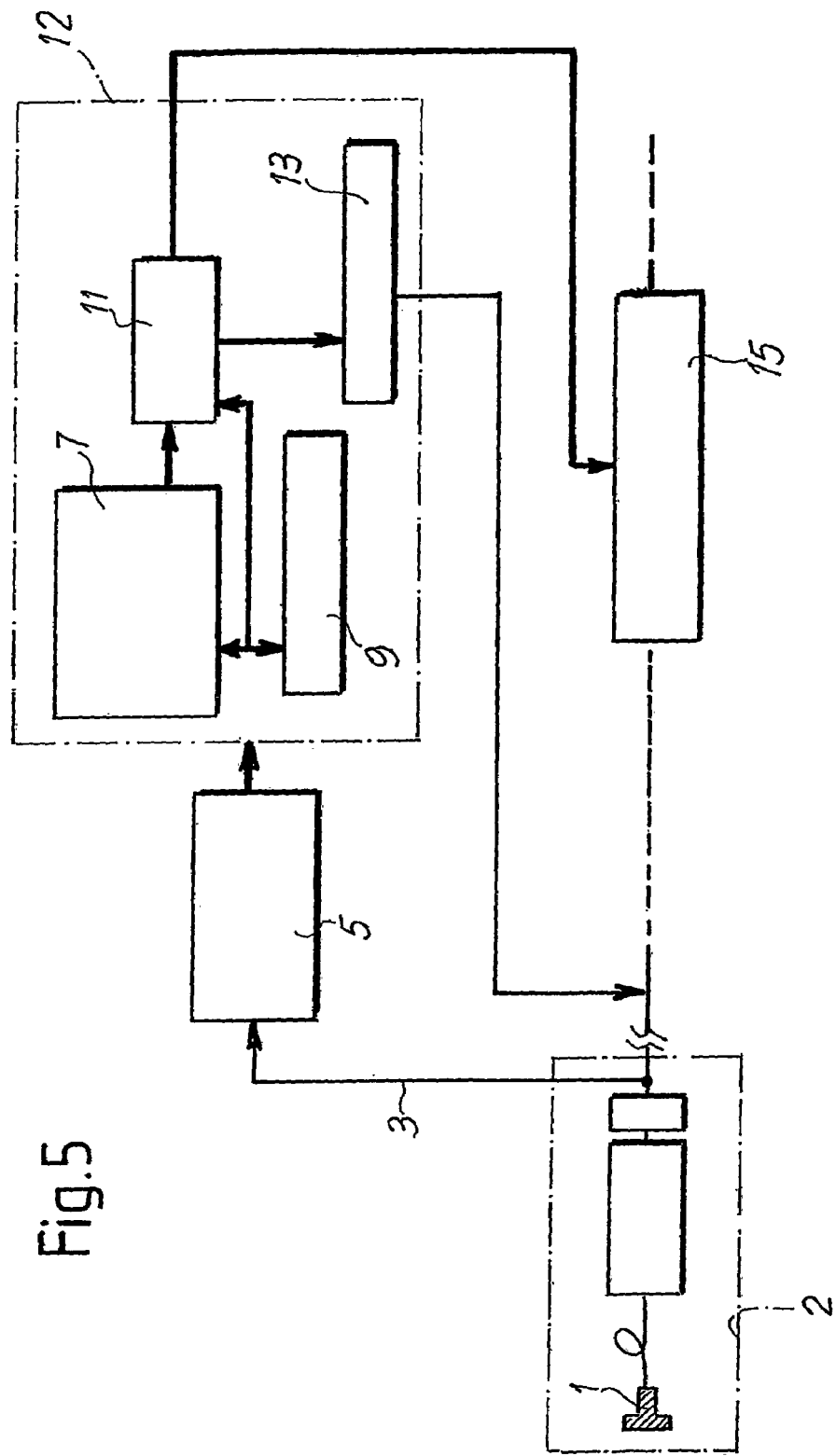

Band 1 [0:2.5 MHz]
Band 2 [2.5:5 MHz]
Band 3 [5:7.5 MHz]
Band 4 [7.5:10 MHz]
Band 5 [10:12.5 MHz]
Band 6 [12.5:15 MHz]
Band 7 [15:17.5 MHz]
Band 8 [17.5:20 MHz]

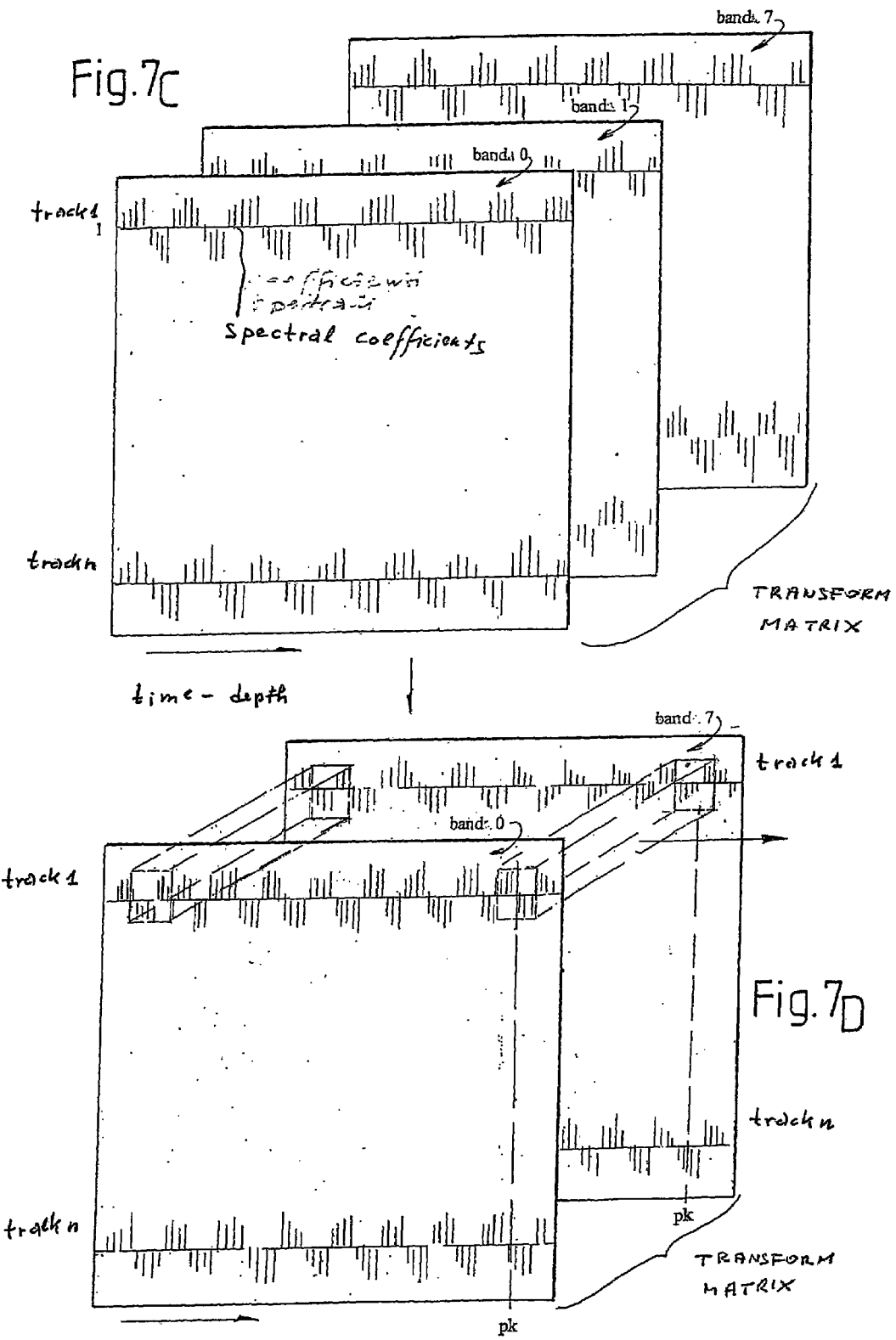

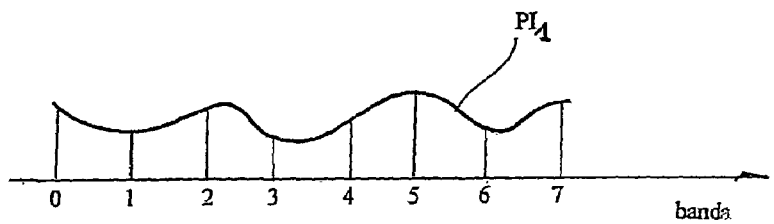
Fig. 7E
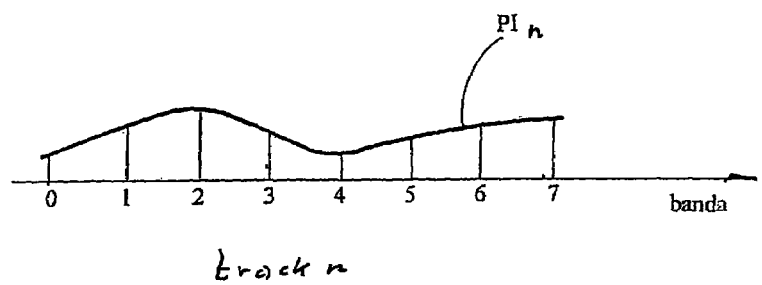
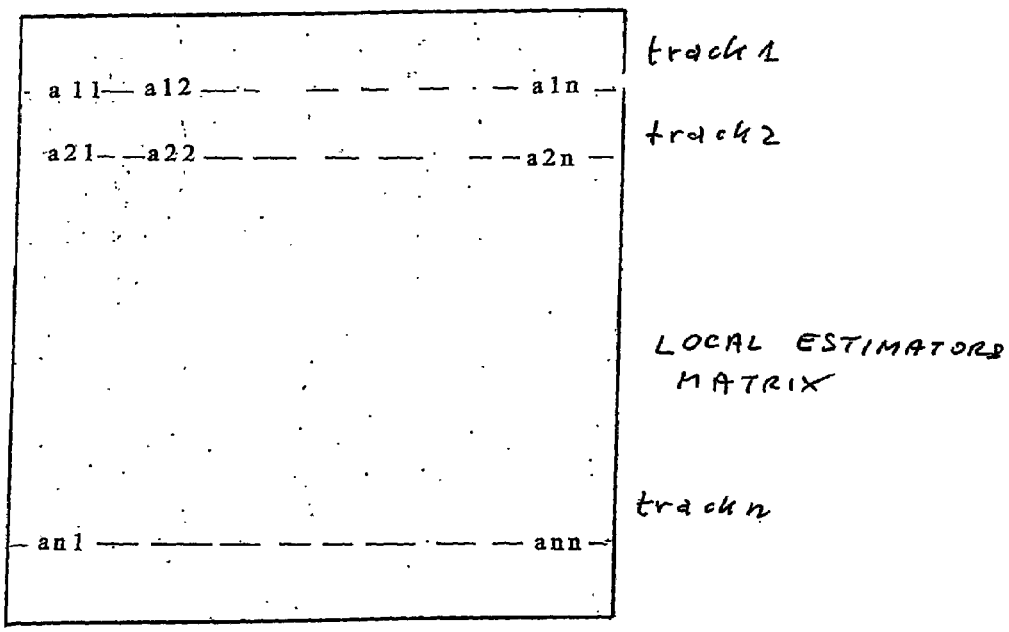
Fig. 7F

LOCAL ESTIMATORS MATRIX $b_{ij} = f(a_{ij}, \sigma_{ij})$

WEIGHTED LOCAL ESTIMATORS MATRIX

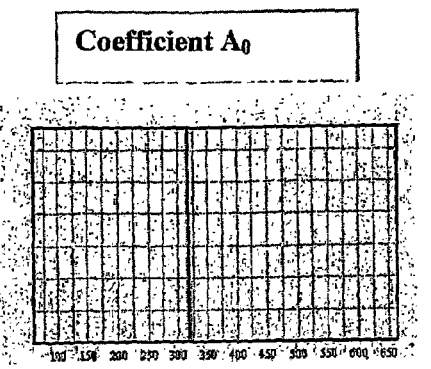
Coefficient A₀
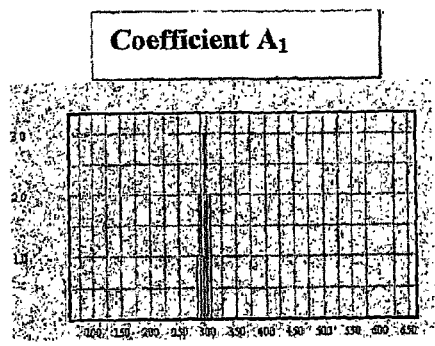
Coefficient A₁
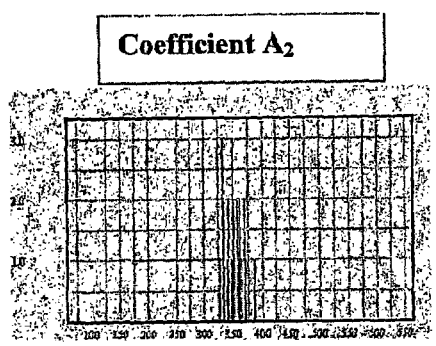
Coefficient A₂
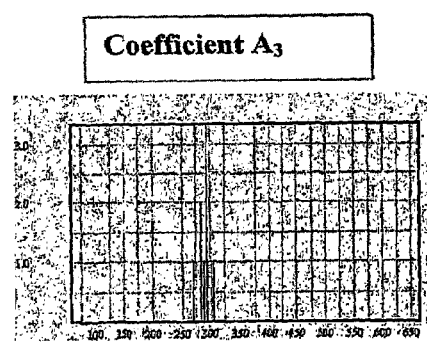
Coefficient A₃
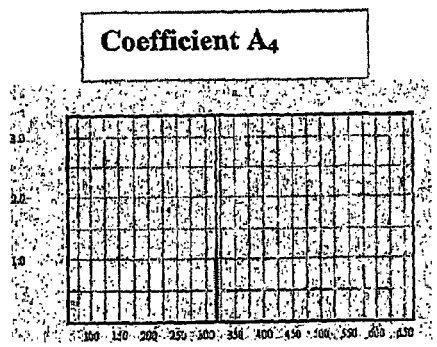
Coefficient A₄
Fig.10

Fig.11
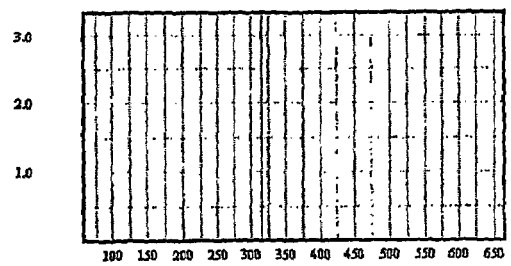
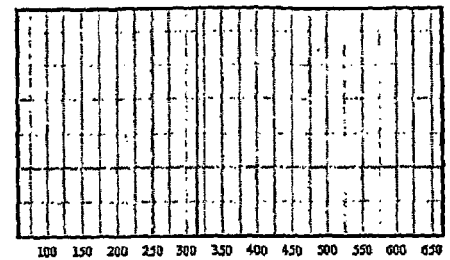
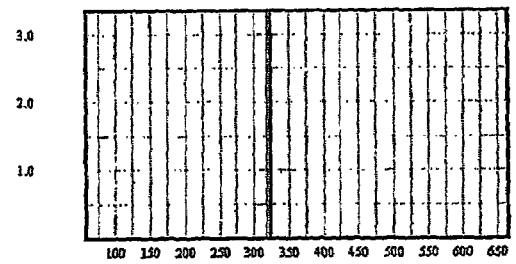
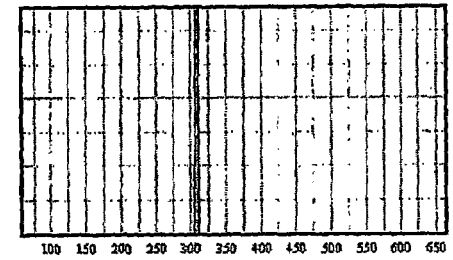
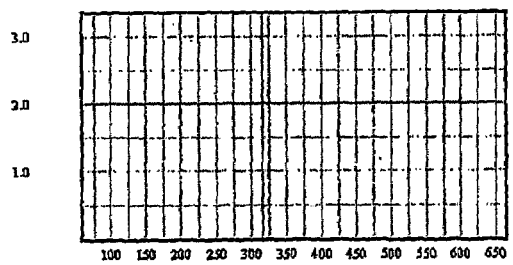

Fig.14
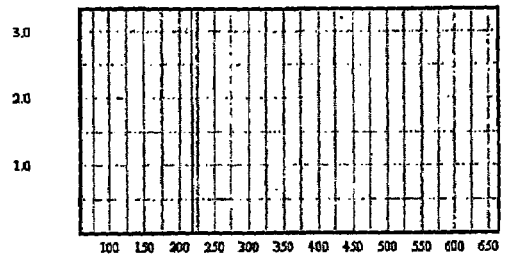
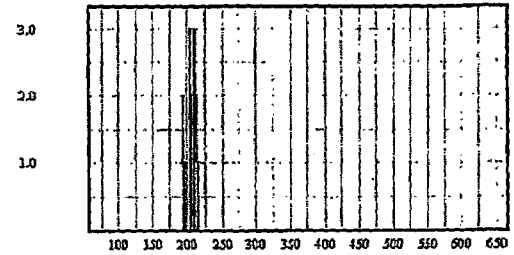
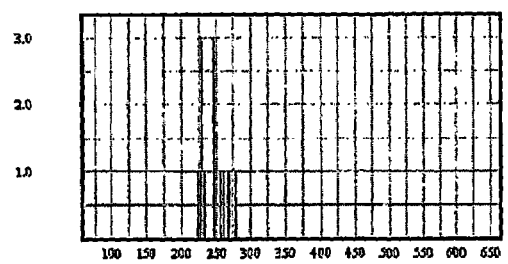
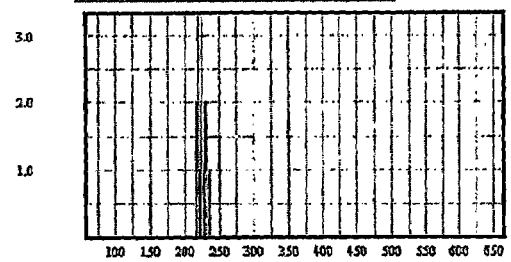
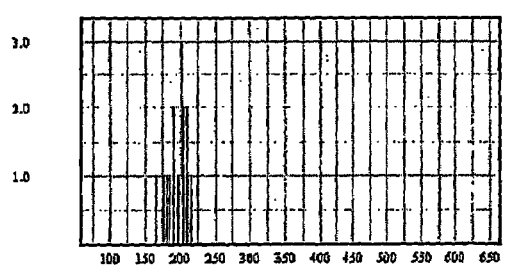
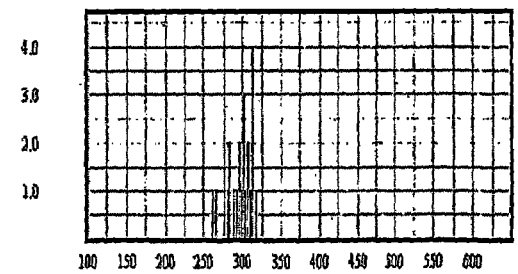

Fig.15
Coefficient A₀
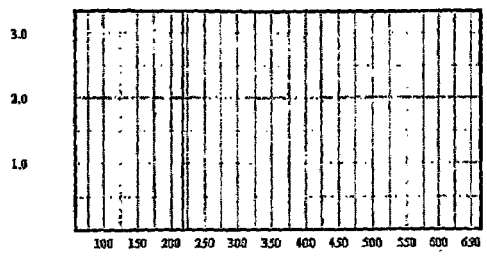
Coefficient A₁
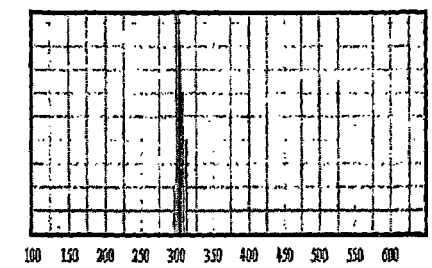
Coefficient A₂
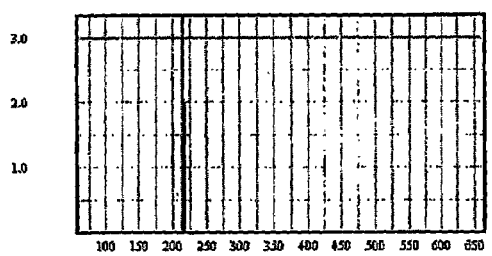
Coefficient A₃
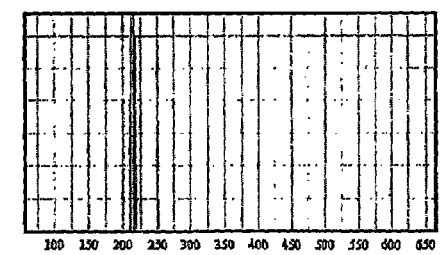
Coefficient A₄
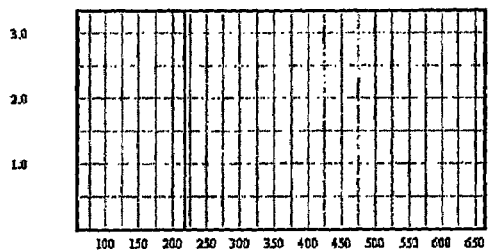
Coefficiente A₅
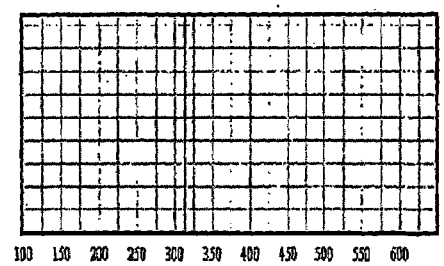

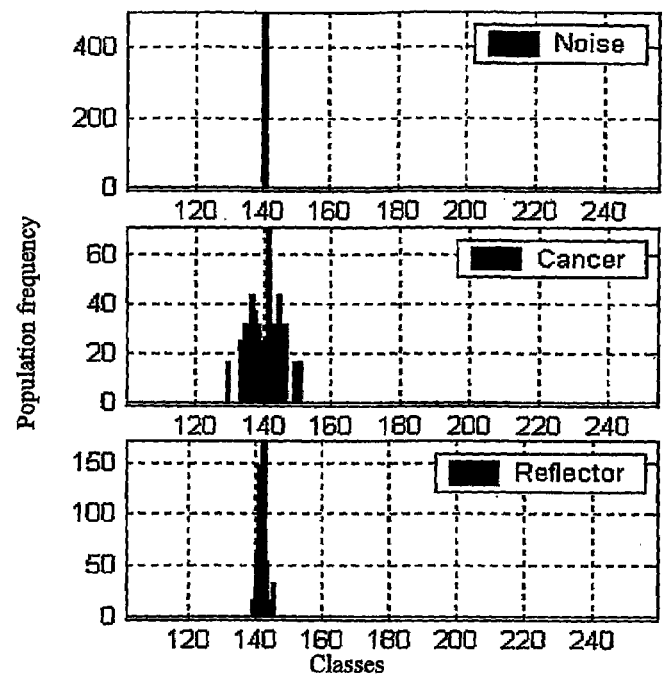
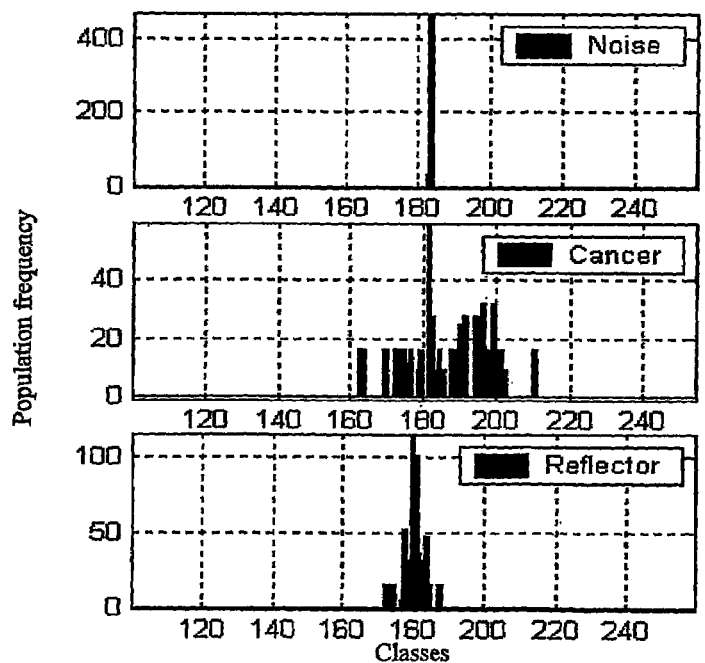
Fig.17B

DISCRETE WAVELET DECOMPOSITION

4th order polinomial    Fig.18C

Plaque polinomial and histograms
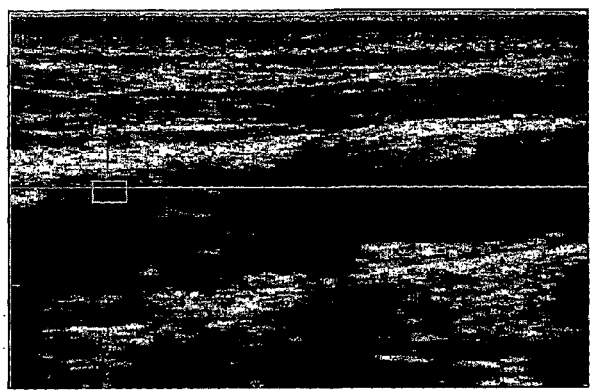
Polinomial cursor and histogram window
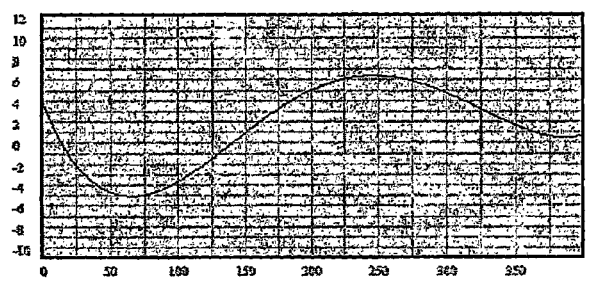
Fig.19
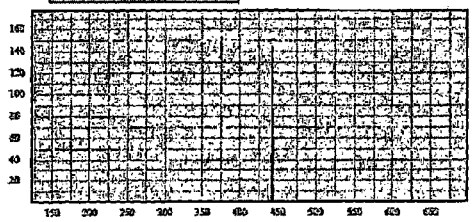
Coefficient $A_0$
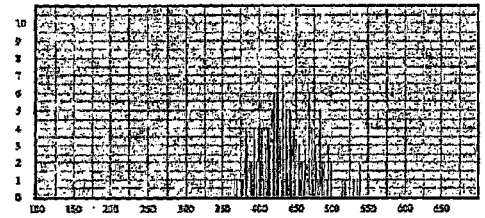
Coefficient $A_1$
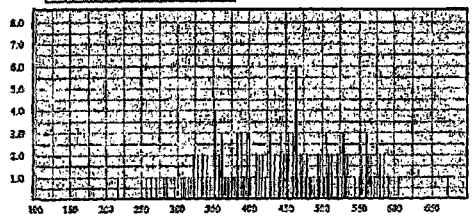
Coefficient $A_2$
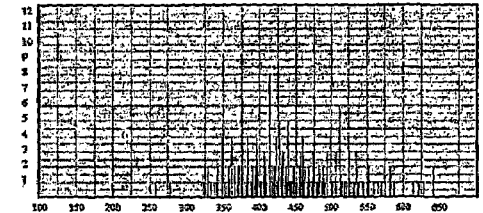
Coefficient $A_3$
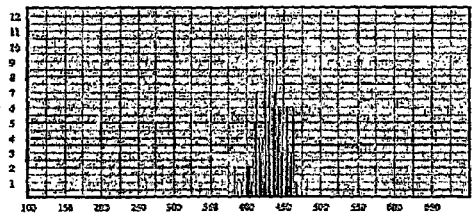
Coefficient $A_4$ Blood polinomial and histograms
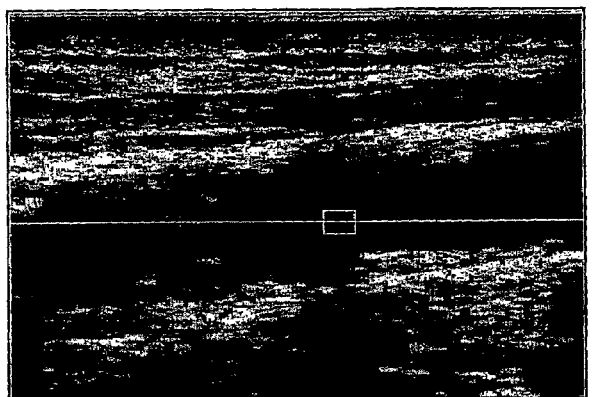
Polinomial cursor and histogram window
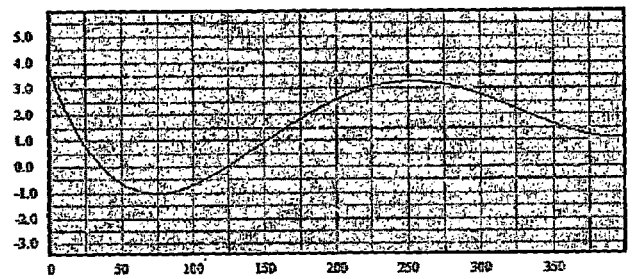
Fig.20
Coefficient $A_0$
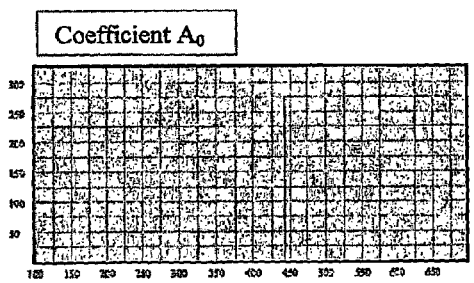
Coefficient $A_1$
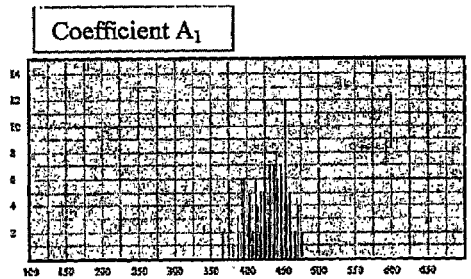
Coefficient $A_2$
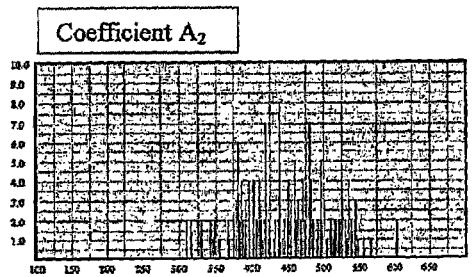
Coefficient $A_3$
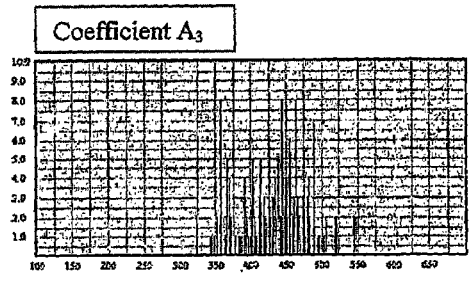
Coefficient $A_4$
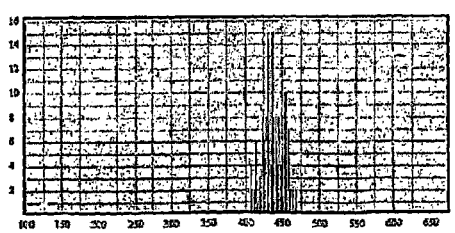

Calcification polinomial and histograms
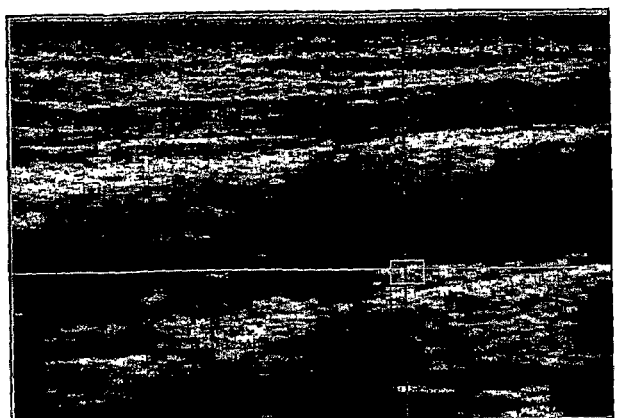
Polinomial cursor and histogram window
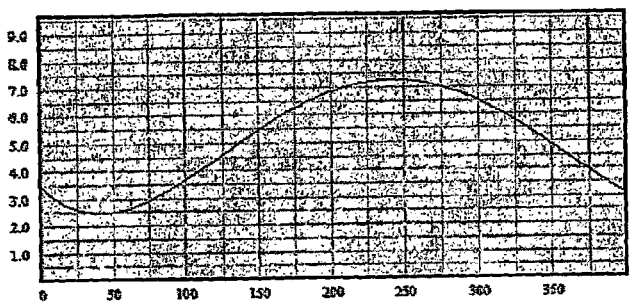
Fig.21
Coefficient $A_0$
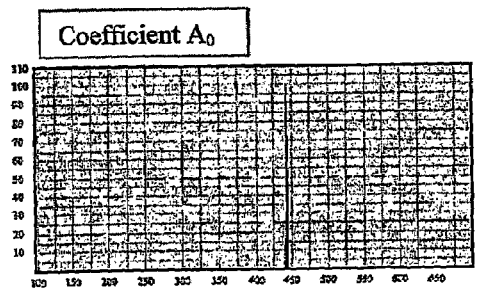
Coefficient $A_1$
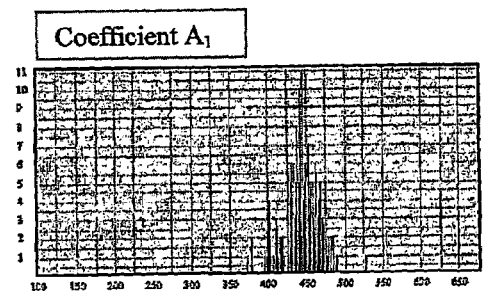
Coefficient $A_2$
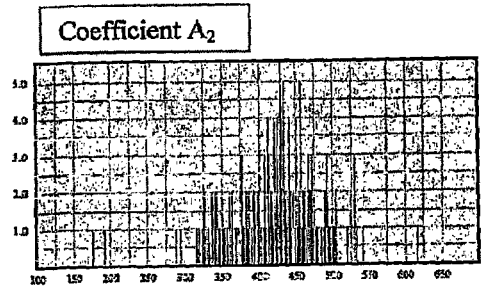
Coefficient $A_3$
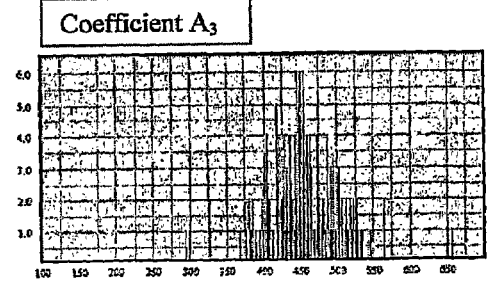
Coefficient $A_4$
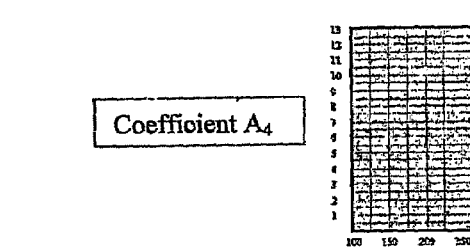

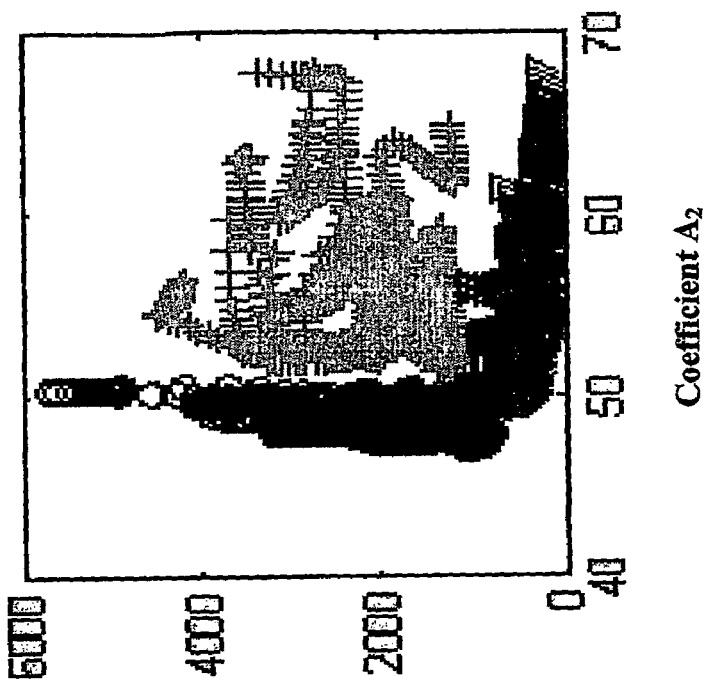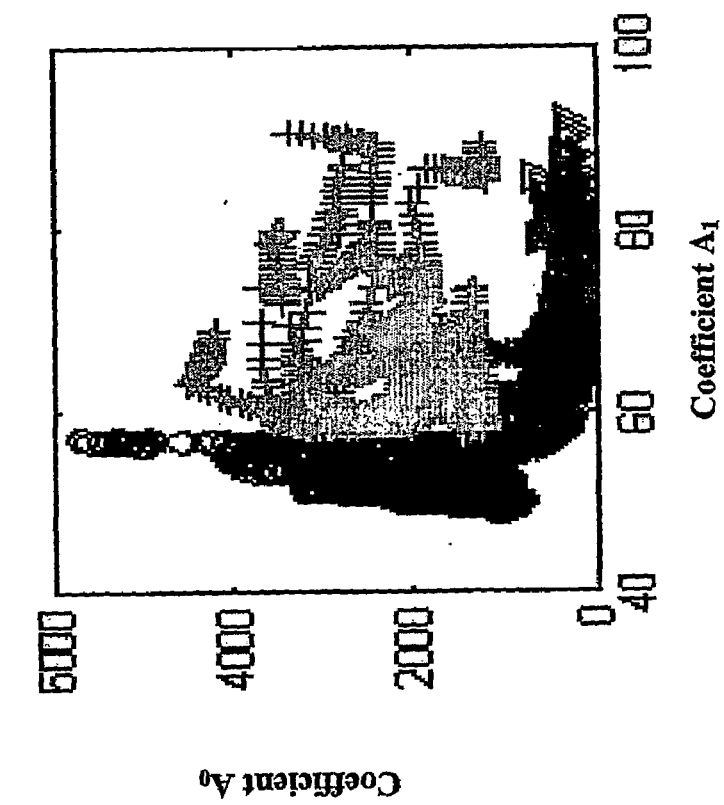
Fig.23

METHOD AND DEVICE FOR LOCAL SPECTRAL ANALYSIS OF AN ULTRASONIC SIGNAL

TECHNICAL FIELD

The present invention relates to a method to process ultrasonic signals, especially in the field of non-invasive clinical tests based on the ultrasonic method. The invention also relates to an ultrasound device for the implementation of a processing method of the ultrasonic signals.

STATE OF THE ART

Ultrasound scanning is a non-invasive investigation method for examining internal organs of the human and animal body and also for non-invasive examination of other types of structures, including non-living and inorganic structures. As is known, it is based on the production of a series of ultrasonic signals (forming an acoustic beam) which are directed into the body and which excite an ultrasonic response signal, caused by the back reflection and/or scattering of sound waves by the diffusers and/or reflectors present within the region under observation. The probe for patient'transmitting and receiving the ultrasonic signal sends the response signal to a receiving and processing system, after which the signal is transformed into a two-dimensional ultrasound image.

Commercial ultrasound scanners supply images relating to the amplitude of the ultrasonic signal back-propagated by the various tissues or interfaces struck by the acoustic beam.

The various tissues or the various interfaces encountered are detected on the basis of their echogenicity, determined by their acoustic impedance, which in turn is the product of the density and the acoustic velocity.

The purpose of conventional ultrasound scanners is to reconstruct and maintain the spatial order of the tissue under examination, by means of the amplitudes detected in the time domain, which in turn provides the spatial location in depth. The conditioning performed on the signal is aimed at maximizing the signal to noise ratio and keeping the sensitivity of the investigation constant when the depth varies.

When the acoustic wave is propagated in a medium and encounters a non-homogeneous region, some of the energy is back-propagated towards the transducer and some is propagated into the tissue.

The back-propagated acoustic signal consists of the temporal overlapping of the contributions from each reflector and/or diffuser; the result is a signal having an extremely complex shape, due to the random nature of the distribution and the shapes and mechanical properties of the diffusers and reflectors. The acoustic signal back-propagated by the medium under examination is converted by the transducer into an electric signal, called radio frequency signal.

FIG. 1 shows a portion of a radio frequency signal forming part of an ultrasound trace relating to biological tissue. More specifically, FIG. 1 shows a portion of a trace of the return ultrasonic signal from a portion of an organ subjected to ultrasound examination. The response time, that is, the depth of the location of the diffuser or reflector which produces the return signal captured by the transducer, is shown on the abscissa. The amplitude of the signal is shown on the ordinate. The ultrasonic image of the organ under examination is reconstructed from a set of traces or tracks of this type, which form a frame of signals. These traces or tracks are referred to sometimes also as scan lines.

A first very simple processing operation carried out on the radio frequency signal is extraction of the signal amplitude by means of an envelope extraction operation. In FIG. 2, the letter l indicates the result of the envelope operation carried out on the radio frequency signal shown in FIG. 1. It will be noted that the envelope signal follows the positive crests of the radio frequency signal and therefore provides an estimate of the signal amplitude.

The envelope operation is currently used in all ultrasonic imaging techniques and forms the basis of the A-mode presentation (where A stands for amplitude) of the individual trace and B-mode presentation (where B stands for brightness) for the resulting images, the amplitude of each individual A-mode trace being encoded on a grey or color scale.

In ultrasound scanners of the present generation, the envelope of the ultrasonic signal is used, that is, the detected signal is represented in the A-mode, B-mode and M-mode traces.

With this solution, there is a loss of the information contained in the radio frequency signal, that is, in the form produced by the receiving transducer, consisting of a signal having a carrier frequency approximately equal to that of the center frequency of the band of said receiving transducer, with a frequency modulation (asymmetrical spectrum) with phase steps (frequency peaks) and possibly with a morphology due to non-linear distortion when the medium shows non-linear effects (production of harmonic spectra).

FIG. 3 shows the envelope signal of the radio frequency trace in FIG. 1, in a conventional A-mode representation. It will be noted that information on the frequency and phase of the original signal has been irretrievably lost.

In particular, if the radio-frequency is eliminated by an envelope extraction operation, there is a loss of:

information obtained from non-linear interactions between ultrasound and biological tissues (local acoustic impedance which depends on the density of the medium, which in turn depends on the intensity of the incident ultrasonic wave, re-emission on the harmonics and sub-harmonics by bubbles present in the contrast medium, etc.);

information obtained from linear interactions, that is, modifications of the signal spectrum due to selective absorption, especially where this is depth-dependent, and the scalloping effect (indentation of the shape of the amplitude spectrum present in signals which have been backscattered by discontinuities, including those of the point type, distributed periodically in space).

Conventional ultrasound scanning systems used for medical diagnosis are therefore based on the observation of an A-mode trace or a B-mode image, which show only the amplitudes of the echo signal relating to the various tissue structures encountered.

Consequently there are situations in which the conventional methods are found to be limited since, owing to low sensitivity or low specificity, it is not possible to obtain a reliable diagnosis of pathology. However, a radio frequency signal contains not only the information relating to amplitude, but also the frequency and phase information (related to the time delays with which the echoes due to individual diffusers reach the transducer).

The latest signal processing methods tend to extract all the parameters characterizing the signal, in particular what is known as the spectral content. Spectral analysis applied directly to the radio frequency signal can extract information from all the characteristics of the echo signal as it is returned from the transducer.

A spectral analysis algorithm for "reading" the signal in the frequency domain makes it possible to provide characteristic values for differentiation of the various types of signal and consequently of the biological structures with which they interact.

Diagram (A) in FIG. 4 again shows the radio frequency signal in FIG. 1, while the diagrams (B) and (C) show the spectral content of the signal for two portions of the trace in FIG. 4A, to show how the structural differences in the tissues result in different types of ultrasonic impulses and consequently distinctive frequency variations in the respective spectrum. The spectral contents of the two portions of signal shown in FIGS. 4B and 4C extend from 0 to 12 MHz. It will be noted that both spectra have approximately the same central frequency (the frequency at which the peak is found) in the vicinity of 4 MHz (the signal relates to scanning with an ultrasonic probe having a nominal frequency of 5 MHz), but have a different frequency variation, since the first graph has contributions (above 5 MHz), which are present to a lesser extent in the other portion of the signal.

In practice, the ultrasonic signals backscattered from the microstructures, due to the differences in the propagation path, interfere on the face of the receiving transducer in a destructive or constructive way, resulting in the "speckle" effect in the images. The difference in the amplitude of the echo signal, that is, the echogenicity, depending on the type of interference, is also influenced by the reflectivity of the tissues which in turn is determined by the mechanical nature, density and elasticity, of the components of the microstructure; for example, a high content of collagen increases local mechanical impedance and thereby echogenicity. Therefore, the following contribute to the appearance of the classic ultrasonic image: spatial agglomeration of the microstructures, which determines the speckle characteristics, and their mechanical nature which determines echogenicity. The mean amplitude variation in space therefore seems not to provide univocal characterization of the tissues as it is influenced by various morphological factors which are formed randomly.

If information can be extracted on the speckle in terms of spatial periodicity (spatial frequency) then it is possible also to acquire information related to any spatial periodicity of the agglomerations under examination.

The radio frequency ultrasonic signal is influenced by the information produced by the speckle of the images, in terms of particular amplitude and phase modulations of the ultrasonic signal.

The information present in the time domain are preserved in the frequency domain and the influence of the speckle is translated into the scalloping effect that consists in a variation of amplitude according to the graphical representation indicated in FIG. 4D. In fact, for example in the case of N diffusers or reflectors (the distinction, which is not unequivocal, is made in relation to the wavelength of the ultrasonic signal) struck by the ultrasonic beam, the spectral density of power, calculated according to the Fourier transform, of the echo signal received $|X(\omega)|^2$ may be represented as:

$$|X(\omega)|^2 = |S(\omega)|^2 \left[ \sum_{i=1}^{N} r_i^2 + 2 \sum_{i=1}^{N-1} \sum_{j=i+1}^{N} r_i r_j \cos\omega(2(l_i - l_j)/c) \right]$$

where:

$|S(\omega)|^2$: spectral density of power of the signal transmitted ri: reflection coefficient of the i-th reflector li: distance between the first and the i-th reflector c: velocity of the ultrasounds.

In the case of only two reflectors separated by a distance equal to 1, the expression takes a simpler form:

$$|X(\omega)|^2 = |S(\omega)|^2 [r_1^2 + r_2^2 + 2r_1 r_2 \cos(2\omega l/c)]$$

$$T = \frac{2\pi}{\Delta\omega} = \frac{2l}{c}$$

is the distance in time between the peaks of the signals back-propagated by the two reflectors.

It can be seen from the schematic formulae that the spectrum is weighted by a cosine with period proportional to the distance of the reflectors; this determines the minimum and maximum values of the spectral power density. This effect is called scalloping, and is represented schematically in FIG. 4D for two reflectors, positioned at variable distances (indicated with S0, S1, S2) from each other in the direction of propagation of the ultrasonic beam.

In order to distinguish two otherwise indistinguishable reflectors, that is, at distance smaller than the duration of the impulse transmitted, it is possible to evaluate the distance between minimums in the spectral domain. In the case of several reflectors the spectrum of the initial signal is weighted by overlapped oscillations having different periods. The formulae also include the coefficients of reflection of the reflectors which determine the amplitude of the backscattered signal.

From the formula it can be seen that the information present in the time domain influence the shape of the spectrum, so that an accurate description of the variation in distribution of the amplitudes in this domain should supply the elements for differentiation of the biological structures.

These exemplificative considerations show how spectral analysis on the radio-frequency signal is a powerful instrument for the characterization of tissues by means of the relative ultrasonic signal.

In recent years the development of new signal processing algorithms has made it possible to obtain further information on tissues, by investigating interaction with the ultrasonic beam in terms of spectral variations induced in the reflected signal. In fact, it has been found that pathological structures can be identified according to the differences in their selective frequency filtering action.

However, the methods developed up to the present time have not proved to be effective, either because they are unsuitable to characterize tissue reliably, or because of the excessive computing capacity required for the algorithms used, which cannot be implemented in a way that permits real time display of the results and would therefore not allow clinical applications where the speed of data output is a basic requirement.

EP-A-1.341.003 describes a new method for spectral analysis of an ultrasonic signal, which overcomes the limits and drawbacks of prior art and allows extraction of the information producing the speckle of the images. The content of this previous publication is fully incorporated in the present description and forms an integral part thereof.

OBJECTS AND SUMMARY OF THE INVENTION

Starting from the method described in EP-A-1.341.003, the object of the present invention is to provide an improvement and extension to the possibilities offered by this type of spectral analysis, to obtain greater and more precise information on the structure under examination.

Essentially, starting out from the same premises on which the method described in EP-A-1.341.003 is based, the invention described herein allows the description of the spectrum to be improved by means of: a suitable choice of the mother wavelet and/or the choice to decompose the entire spectral band of the signals into a variable number of sub-bands of arbitrary width and position, so as to extract from the sample under investigation the greatest possible amount of information and/or a more effective use of the coefficients characteristic in the description of the local spectrum.

In practice, according to a first aspect, the invention is based on the idea of combining local estimators, hereinafter also called local spectral parameters, obtainable from the ultrasonic signal by means of a procedure analogous to the one described in EP-A-1.341.003, using information relative to the shape of the distribution histograms in various classes of values of said local estimators. In practice, from a frame of radio frequency signals collected from a structure under examination, one or more frames or matrices of local spectral parameters or local estimators are obtained. Subsequently, these estimators are processed statistically, by moving a window with pre-established dimensions along the matrix of the local estimators to determine the distribution histogram of the local estimators in various classes of values. A parameter relating to their shape, for example the standard deviation, is obtained from these histograms. The local estimators are then combined, for example multiplied, divided or processed in another way together with the shape parameters of the distribution histogram. A new matrix of local weighted estimators is thus obtained, to allow value intervals of the estimators to be associated with homogeneous regions of the investigated sample. These regions will then be identified by histological analysis. Representation of these regions of the original ultrasound frame takes place by means of a color code overlaid on the conventional B-mode image.

The method of the present invention may be abbreviated to the RULES method (Radiofrequency Ultrasonic Local Estimator) as it is based on the use of local estimators which contain spectral information regarding the ultrasonic radio frequency signal returned from the structure examined.

As shall be apparent from the text hereunder, the local estimators are represented by the coefficients of a suitable degree, for example fourth or fifth degree, interpolating polynomial, which approximates the coefficients obtained for the various frequency bands into which the digitized and sampled radio frequency signal was previously subdivided. Alternatively, the local estimators may consist in combinations of coefficients of various degrees of the interpolating polynomial. The combination of coefficients of various degrees can take place before or after having weighted each coefficient with the shape factor of the distribution histogram.

According to a different aspect, the invention consists in processing the coefficients of the interpolating polynomial to obtain local estimators from a combination of two or more coefficients of different degree of said polynomial, without weighting the coefficients by the shape parameter of the distribution histogram. Also in this case greater information is obtained with respect to prior art methods, as several combined coefficients of the interpolating polynomial are utilized instead of a single coefficient.

Subdivision into bands, that is, decomposition into bands or sub-bands can take place with various criteria. Moreover, also the shape parameter of the distribution histogram of the local estimators can be chosen in various ways. In particular, it is possible to:

1. use different Mother Wavelets to adapt to the typical speckle of the investigated tissue;

2. use different levels of decomposition both to obtain different spatial resolutions and to use various subdivisions of the overall spectrum available in a combined way;

3. use combinations of the coefficients of the interpolating polynomial "weighted" with parameters related to the nature of their statistical distribution by means of a targeted study of the histograms through specific parameters such as:
   most populated classes
   standard deviation
   kurtosis
   higher degree moments
   symmetry index The combination of suitably weighted coefficients produces, for each window (the dimensions of which can be set) of the processed ultrasound image, a new matrix consisting of these combinations. A new statistic is performed on it and the classes associated with the various structures to be characterized are chosen. To increase the differentiation capacity of the tissues, that is, identification of the "typical" classes, combined analysis of the classes is once again used.

Particularly advantageous embodiments of the method according to the invention are indicated in the attached claims and shall be described in greater detail below with reference to some examples of embodiments and experimental tests performed.

According to a different aspect, instead of performing a combination or weighting operation of the local estimators and the shape parameters of the distribution histograms of said estimators, according to the invention two or more local estimators can be combined and this combination can be used as a combined local estimator. For example, several matrices of local estimators can be produced, in which the individual coefficients are constituted, in each matrix, by coefficients of various degrees of the interpolating polynomial. Subsequently, coefficients in homologous positions of these matrices can be combined, for example the coefficients of all or some of said matrices can be added or multiplied together. In conclusion, in this way a matrix of coefficients is obtained, each of which is composed of a function of the local estimators contained in the previously obtained matrices.

BRIEF DESCRIPTION OF THE DRAWINGS

The invention will now be more clearly understood from the description and the attached drawing, which shows a non-limiting practical embodiment of the invention. More specifically:

FIGS. 1 to 4A-4D, already described above, show an ultrasound trace and a representation of the spectral content in two portions of said trace;

FIG. 5 shows a simplified block diagram of an ultrasound scanning apparatus;

FIGS. 7A-7H schematically show the processing sequence on the ultrasonic signal performed by the method according to the present invention;

FIG. 10 shows the distribution histograms of the various orders of coefficients of the fourth degree interpolating polynomial relating to the portion of lipid plaque of the carotid artery;

FIG. 11 shows the distribution histograms of the coefficients of the interpolating polynomial in the blood;

FIGS. 14, 15 and 16 show, analogous to FIGS. 10, 11 and 12, the distribution histograms of the various coefficients of the fifth degree interpolating polynomial in the various regions of lipid plaque, blood and calcification;

FIGS. 17A and 17B show the distribution histograms of the coefficients of the fourth order interpolating polynomial applied to the analysis of a prostate gland;

FIG. 18C shows the variation of the fourth order interpolating polynomial obtained by applying the decomposition in FIGS. 18A, 18B to an ultrasonic response signal of a carotid artery; and FIGS. 19, 20 and 21 each show a B-mode ultrasound image of a portion of a carotid artery affected by lipid plaque and calcification phenomena, and the variation of the interpolating polynomial and the distribution histograms of the coefficients of the various degrees of the interpolating polynomial, in the three regions affected respectively by lipid plaque, blood (free vessel) and calcification;

FIGS. 23A and 23B show explanatory graphs of the classification procedure of the local estimators.

DETAILED DESCRIPTION OF THE PREFERRED EMBODIMENT OF THE INVENTION

Figure 1:
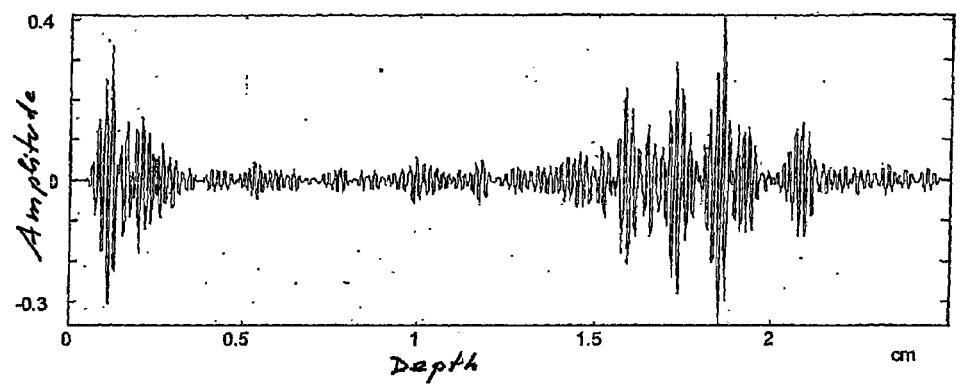
Figure 2:
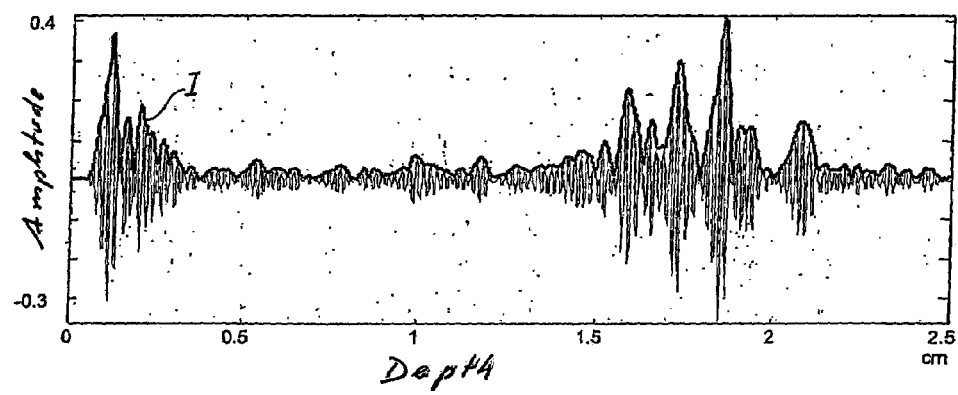
Figure 3:
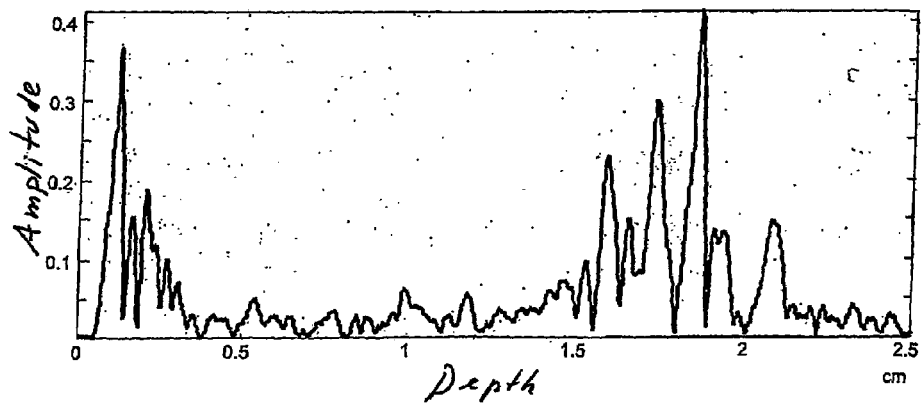

FIG. 5 shows a highly schematic block diagram of an ultrasound scanning apparatus. The number 1 indicates a transducer of the scanning head, indicated generically with 2, which emits the ultrasonic excitation signal and receives the ultrasonic response signal. The analog output 3 of the scanning head is connected to an acquisition card 5. The latter produces a sampled and digitized radio frequency signal, which forms the input for a bank of integrated FIR filters, indicated generically with 7. The bank of filters 7 can consist of any commercially available integrated device, for example the 43168 circuit produced by Harris, the GF191 circuit produced by Gennum, the GEC 16256 circuit produced by Plessey, or the GC2011 circuit produced by Graychip. The FIR filter 7 is associated with a digital signal processor (DSP) indicated with 9, which acts as a controller for the whole processing unit. The microcontroller 9 can be, for example, a TMS 32031 DSP produced by Texas (USA) or another equivalent.

The number 11 indicates a memory associated with the filter 7 and with the controller 9. The memory 11 is connected to an analog/digital converter 13 and to the digital stages of the scanning head 2.

Figure 6A:
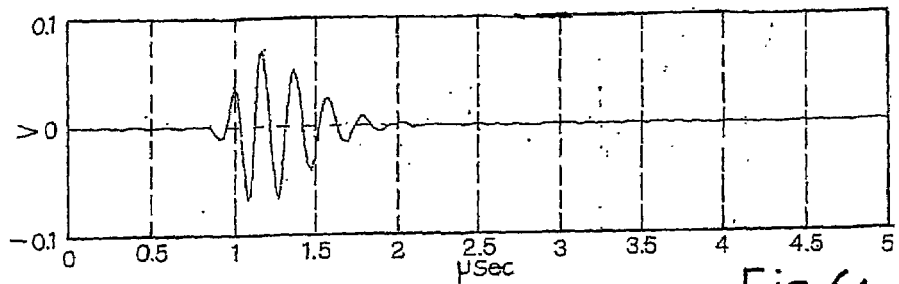
FIG. 6A shows an ultrasonic excitation signal sent by the transducer into the organ to be examined.

The circuit described here is known and does not require more detailed description. Essentially, the apparatus operates as follows. The transducer 1 emits a series of ultrasonic excitation signals having, for example, the form shown in FIG. 6A, into the body containing the organ to be examined, for example the prostate, the liver or another part. The tissue struck by the ultrasonic waves of the signal emitted by the transducer 1 returns a scattered or reflected signal which has the form of the signal in FIG. 1 (radio frequency signal).

The radio frequency signal is taken from the receiving circuit of the ultrasound scanner immediately after the time gain compensation (TGC) unit and is then digitized at a suitable sampling frequency, for example 40 MHz, and with a resolution of 12 bits (or other suitable resolution), by the acquisition card 5. In practice, acquisition is carried out for individual traces until a frame or a portion of a frame is completed. The signal samples acquired for each individual trace are stored in a memory bank of the acquisition card until a complete frame or a portion of a frame has been acquired; it is only at this point that the stored data are sent to the processor card comprising the DSP 9 and the FIR filter 7 which executes the operations to be described in detail below, according to the method of the present invention. While the data is being transferred to the processor card, the acquisition card starts to acquire the signal samples of the traces for the next frame. The processing time of the processor card 12 is short enough to allow processing to be completed within the acquisition time of the sampled signal for the next frame. Thus real time operation is achieved.

The processor card 12 carries out processing of the signal, particularly the time-frequency transform using the integrated filters 7 and the other operations to be described in greater detail below, to obtain characterization of the signal spectrum.

FIGS. 7A-7E summarize, in the form of graphs, the operations carried out on the input signal to obtain the representation of the matrix containing the information relating to the suitable combination of local estimators determined using the method according to the present invention. For a detailed description of the operations performed in the various processing phases in a specific example, reference can be made to the description in EP-A-1.341.003, where not described in detail herein.

Processing of the sampled and digitized signal acquired by the card 5 commences with the application of a time-frequency transform to encode the signal into sub-bands. Essentially, for each track of the acquired, sampled and digitized frame, the signal is decomposed into a series of frequency bands or sub-bands using a time-frequency transform, such as a wavelet transform, and in particular by means of discrete wavelet packet decomposition. Filtering is performed by the bank of integrated filters 7. The number of bands or sub-bands into which the digitized signal is decomposed depends on the number of consecutive filtering operations used. In the explanation below, reference will be made to a decoding procedure into eight bands or sub-bands, which will be indicated below as band 0; band 1, . . . band 7. However, as shall be apparent hereunder, this value is not binding; on the contrary, an innovative aspect of the method of the present invention consists in the capacity to extract from the radio frequency ultrasonic signal a larger amount of information for tissue characterization by decoding into a number of bands or sub-bands of various width (that is, with amplitude varying from band to band) and in a number that may be different than eight.

Figure 6B:
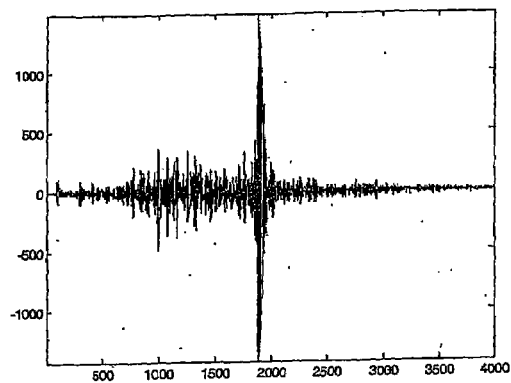
FIGS. 6B to 6D respectively show the RF response signal, the Daubechies 16 wavelet used for filtering the digitized RF signal and the coefficients of the DWPT obtained by decomposition into eight bands.
Figure 6C:
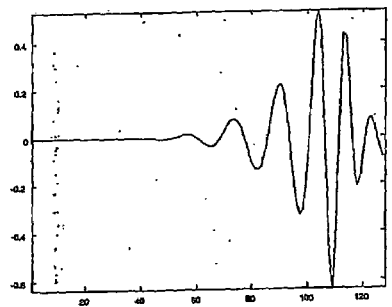
Figure 6D:
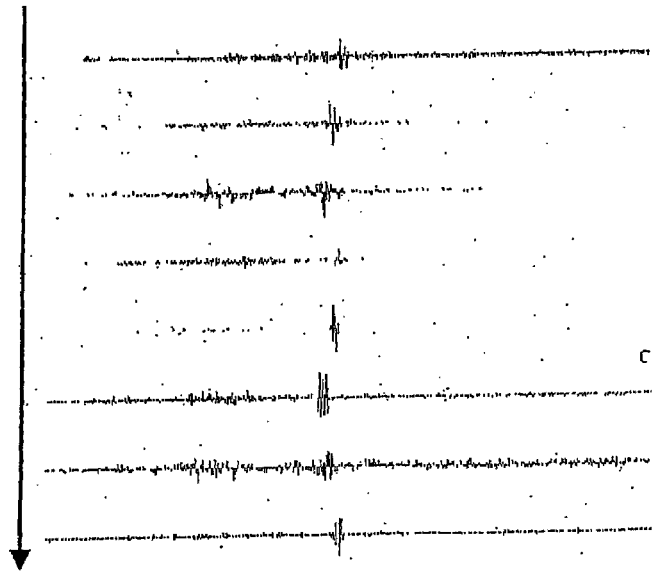

The filter coefficients can be defined by using a Daubechies 16 wavelet. By way of example, FIG. 6C shows the variation of the Daubechies 16 wavelet and FIG. 6D shows the variation of the DWPT coefficients obtained by filtering the digitized and sampled RF signal in FIG. 6B. However, the type of time-frequency transform used may also vary as a function of the type of structure or tissue to analyze. For example, different wavelets to the Daubechies 16 can be used. Typically, to examine the carotid artery, a biorthogonal 3.7 wavelet can be used for characterization of carotid plaques, as shall be explained below with reference to some experimental data.

The number of filter coefficients is generally low, for example 32 for the Daubechies 16 filter, and the coefficients can therefore be implemented easily in a commercially available circuit, which can normally provide filters with a limited number of coefficients, not exceeding 64 for each section, with decimation by 4, if the filter is not of the linear phase type, while a maximum of 128 can be obtained with two sections in cascade. The coefficients of the filters which provide a wavelet transform are defined recursively and are known. For example, it is possible to use the coefficients defined in U.S. Pat. No. 6,066,098, the content of which is incorporated in the present description.

Figure 7A:
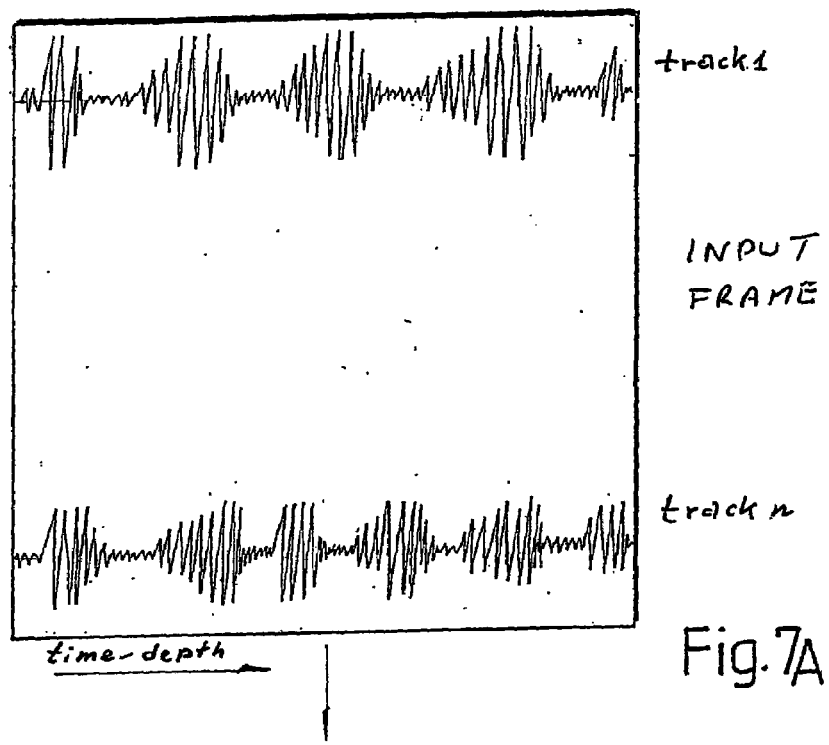
Figure 7B:
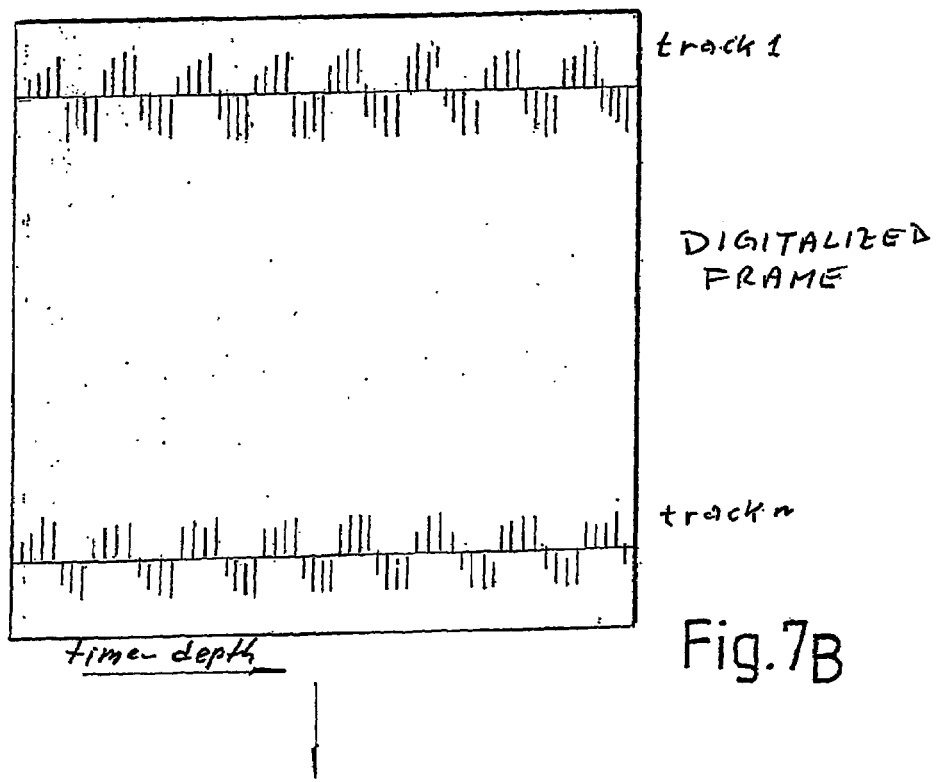

FIG. 7A schematically shows a frame acquired by the scanning head of the ultrasound scanner. The frame, referred to below as the "input frame", consists of a plurality of n tracks. Each track consists of an analog signal represented by the wavefront reflected or back-propagated by the tissues in which the ultrasonic excitation signal is propagated. After sampling and digitization, a frame is obtained (FIG. 7B) which also consists of n tracks, each of which contains a series of digitized signal samples. This frame will be referred to as the "digitized frame".

By applying the time-frequency transform to the digitized frame, that is, by filtering the sampled and digitized signal consisting of the set of coefficients forming the digitized frame (shown schematically in FIG. 7B), a distribution in bands or sub-bands is obtained: in practice, for each track from 1 to n there is, for each instant of time, i.e. for each sample in the time direction (that is, in the direction of propagation of the signal), a coefficient in each of the bands shown schematically in FIG. 7C and indicated as band 0, band 1, . . . band 7.

In the example shown the bands are eight and are all of the same width. Nonetheless, as mentioned above, it must be understood (as will also be explained below with reference to some experimental data) that the number of bands into which the signal is decomposed may be greater. With a greater number of decoding sub-bands from the radio frequency signal a greater amount of information on its spectral characteristics, and therefore on the structure under investigation, is obtained. Moreover, subdivision into sub-bands can also be obtained with frequency intervals (that is, band amplitudes) which are not constant, that is, in bands or sub-bands with a variable amplitude and with filters of any form. The choice of the type of decomposition will follow experimental criteria as a function of the type of tissue or other structure to be subjected to ultrasound investigation.

The matrix containing the coefficients of the time-frequency transform is indicated below as "transform matrix"; the coefficients of said matrix are indicated as "spectral coefficients". This is a three-dimensional matrix, the dimensions of which are given by: number of tracks, number of samples per track, number of bands or sub-bands into which the radio frequency signal has been subdivided.

The subsequent operation consists in extracting the local estimators of the signal for each point of the matrix of the spectral coefficients (and therefore for the various points of the input frame from which the matrix of the spectral coefficients was obtained with the operations explained above).

For this purpose, for each temporal instant, that is, for each point along the dimension of time (that is, of depth) the coefficients of the various bands 0-7 are taken along each individual track and an interpolating polynomial which approximates the variation of these coefficients is determined. This operation is shown schematically in FIGS. 7D, 7E. More specifically, FIG. 7D shows the spectral coefficients in the various sub-bands, relating to track 1 and to track n, by way of example of a generic temporal instant pk. All the coefficients of the various bands 0-7 in position l,k and n,k are shown aligned with one another respectively in the first and in the second diagram in FIG. 7E, where $Pl_1$ indicates the interpolating polynomial, that is, the polynomial which optimally approximates the spectral coefficients aligned at the depth k on track 1 and $Pl_n$ indicates the interpolating polynomial relating to the spectral coefficients aligned at the depth k on track n.

One or more coefficients of this polynomial constitute a local estimator which allows, as will be explained below, extraction of the required information on the spectrum of the radio frequency signal. In fact, this parameter is indicative of the variation of the spectral characteristics of the signal. This is because it is related, by definition, to the properties of the polynomial which approximates the variation of the spectral coefficients in each band for each point of the matrix of the spectral coefficients and therefore, indirectly, of the input frame. In other terms, the local spectral estimator extracted from the interpolating polynomial Pl provides a qualitative indication of the variability of the spectral characteristics of the RF signal at a given point of the input frame.

Since the interpolating polynomial is calculated at each point of the input ultrasound frame, the result of this operation—for each coefficient of the interpolating polynomial—will be a matrix consisting of the set of spectral estimators. This matrix, referred to below as the "local estimator matrix" or "local estimator frame", is shown in FIG. 7F for a single coefficient of the interpolating polynomial. Here the individual values of the local estimator are indicated by $a_{ij}$, where i varies from 1 to n, n being the number of tracks in the matrix, and j varies from 1 to m, m being the number of coefficients per track. It must be understood that, depending on the significance of the individual coefficients of various orders of the interpolating polynomial, it would be possible to create a matrix of local estimators for each coefficient of the polynomial. Therefore, for a fourth order interpolating polynomial it would be possible to construct up to five local estimators matrices, one for each of the five coefficients of the polynomial. A higher number of matrices can be constructed using a polynomial of a higher degree. Not all the coefficients of the polynomial may necessarily be useful in the spectral characterization of the individual ultrasonic signal. The greater or lesser significance of these coefficients is determined experimentally as a function of the type of tissue or structure to be investigated. Some non-limiting examples will be described below.

The least squares method of approximation is useful for the calculation of the values of the coefficients of the polynomial. This method can be used to determine the polynomial of degree m<n−1, given a number n of experimental observations $y_0, y_1, \ldots y_{n-1}$ corresponding to the abscissae $x_0, x_1, \ldots x_{n-1}$:

$$P(x) = a_0 + a_1 x + \ldots + a_m x^m$$

which gives the best approximation of the detected data.

Considering the sum S of the squares of the differences between the approximate and the observed, values, $$S = \sum_{j=0}^{n-1} (a_0 + a_1 x_j + \ldots + a_m x_j^m - y_j)^2$$

the coefficients must be selected in such a way that S is minimal, in order to make the polynomial approximate the data as closely as possible. By deriving with respect to the coefficients and equalizing the result to zero, and given $$s_k = \sum_{j=0}^{n-1} x_j^k \text{ and } v_k = \sum_{j=0}^{n-1} x_j^k y_j$$

the system of equations is obtained, which can be written in matrix form as:

$$a = Q^{-1} v$$

where a is the vector of the coefficients of the polynomial P(x).

It was observed for the various types of tissue and for various pathological conditions that the values of the coefficients of the interpolating polynomial take statistically determined values. By defining the classes of values, it was further observed that the statistical distribution, that is, the distribution histogram of each coefficient of the interpolating polynomial, has a variable shape depending on the type of tissue and any pathological conditions it may have. According to one aspect of the present invention, the method is based on this finding and uses the shape parameters of the histogram to extract a greater number of spectral information from the ultrasonic signal.

To understand the importance and extent of this variation of the shape of the histogram in various conditions and for various tissues, reference should be made to FIGS. 8A to 17B.

In analyzing the carotid artery to check for the presence and consistency of any carotid plaques, for example, it was found that by using a decoding into sixteen bands with a biorthogonal 3.7 wavelet and by using a fourth order interpolating polynomial, not only the third but also the other coefficients of the polynomial have a significant distribution for characterization of the investigated tissues. It was also found that analysis of the distribution histograms show a different morphology of the distribution histograms depending on the various types of tissue examined.

Figure 8A:
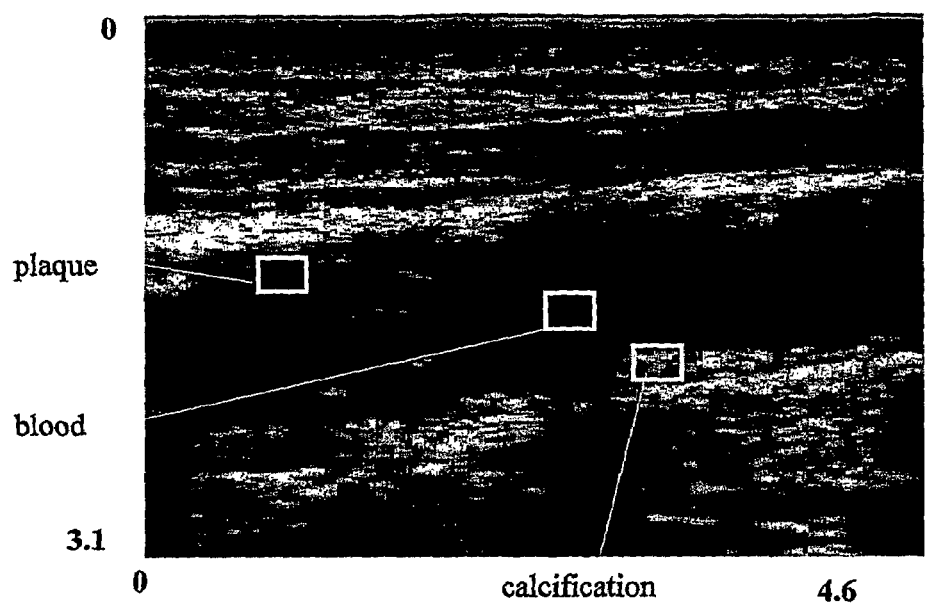
FIGS. 8A and 8B show the B-mode ultrasonic images respectively of the carotid artery and prostate, on which the results shown in FIGS. 9A to 17B were obtained.

FIG. 8A shows the B-mode ultrasound image of the carotid artery used to obtain the experimental results discussed below. Also identified on the image are three windows centered on the lipid plaque, in the free region of the vessel, that is, on the blood, and on the calcifications. The coefficients of the matrix of local estimators were calculated in these regions having tissue structures differing from one another, showing that these estimators have a statistical distribution which varies according to the type of tissue investigated.

Figure 9A:
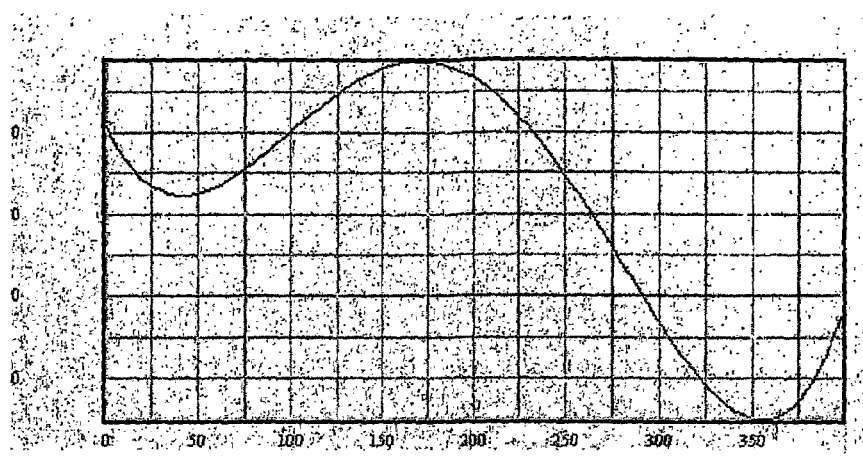
FIGS. 9A-9C show the variation of three fourth degree interpolating polynomials in a particular application to the examination of a carotid artery, relating to the portion of lipid plaque, blood and calcification.
Figure 9B:
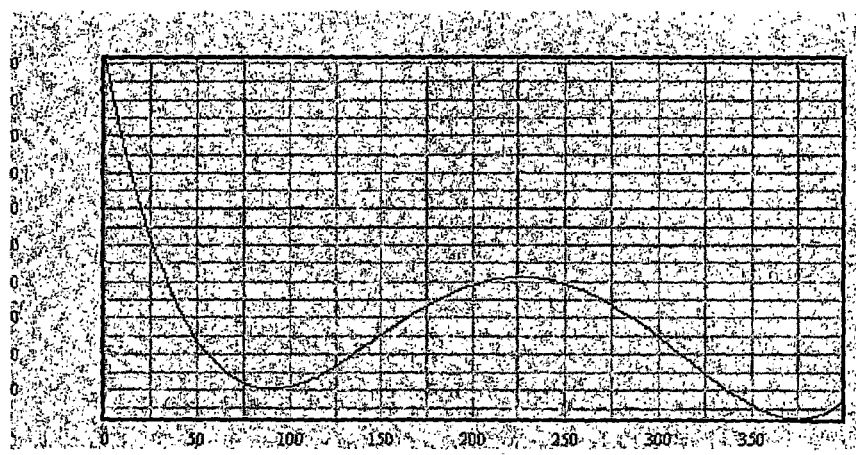
Figure 9C:
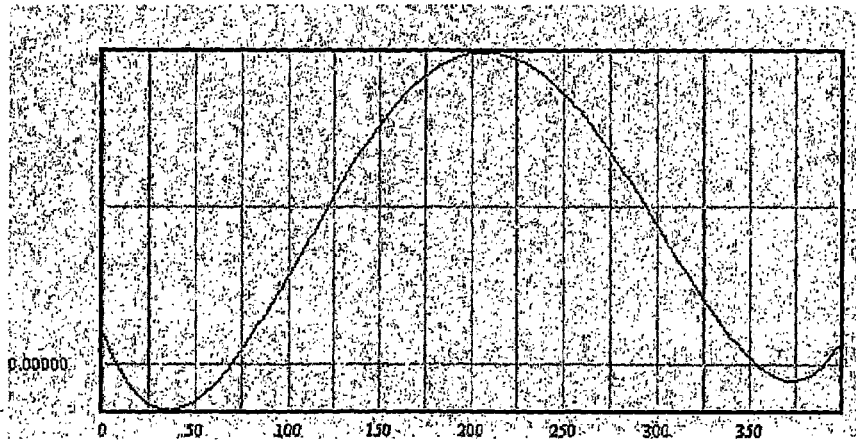

FIGS. 9A, 9B and 9C represent the variations of the three fourth order interpolating polynomials relating respectively to plaque, blood and calcifications. In other terms, following the digitized radio frequency signal decoding and processing method described above, the fourth order polynomials which optimally approximate the spectral coefficients (that is, the coefficients of the matrix of the transform) have the variation in FIG. 9A for the portions of image relating to a lipid plaque, the variation in FIG. 9B for the portions of image relating to the free region of the vessel, in which blood flows, and the variation in FIG. 9C for the portions of image relating to the regions in which calcification is present.

Figure 12:
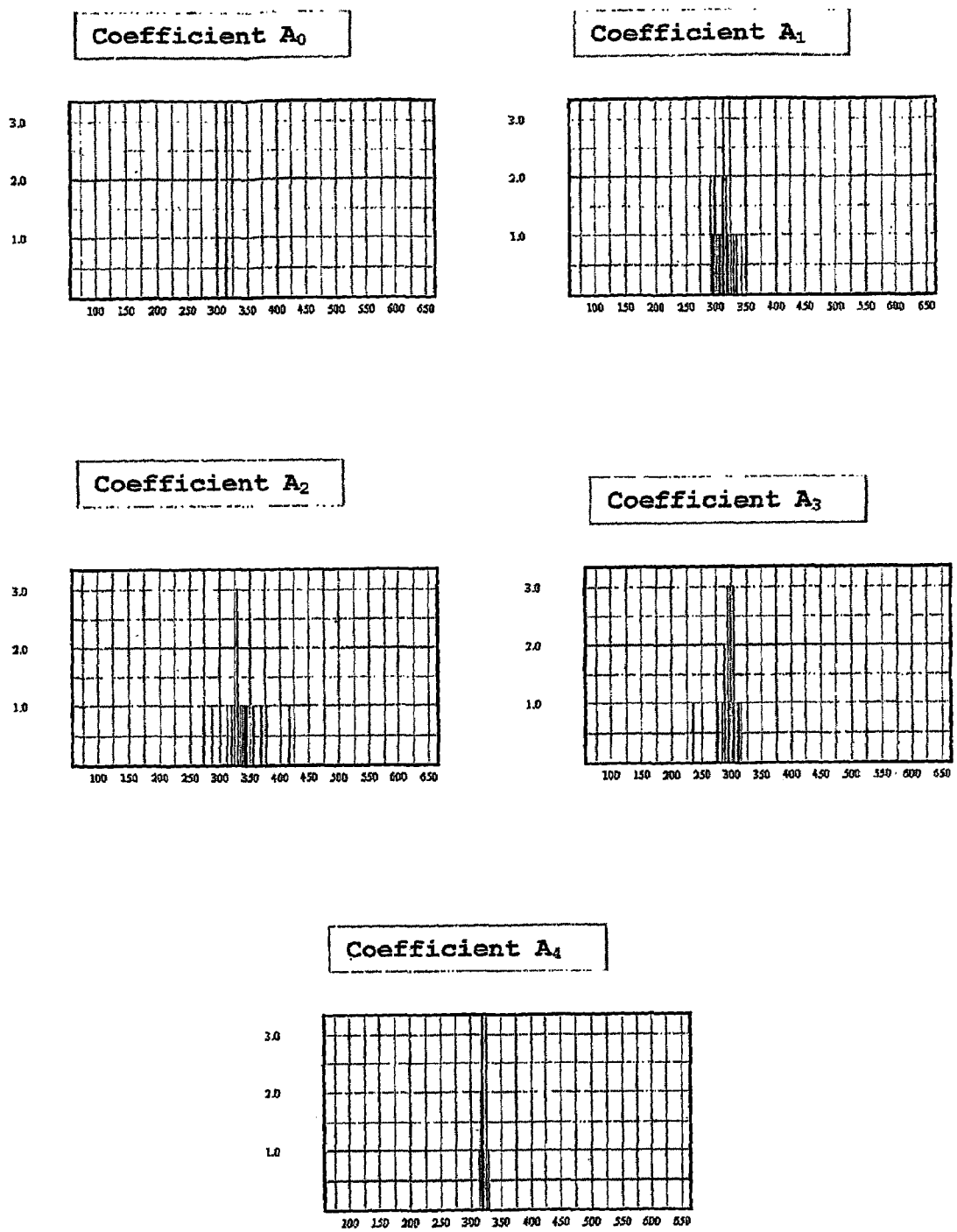
FIG. 12 shows the distribution histograms of the coefficients of the interpolating polynomial in the calcification region.

FIGS. 10, 11 and 12 show the statistical distribution histograms, in the various classes of reference, of the five coefficients of the interpolating polynomials in FIGS. 9A, 9B and 9C respectively, obtained by analyzing the various regions of a portion of carotid artery. The classes of reference are indicated on the abscissas and the population frequencies on the ordinates.

For each of the five coefficients taken into consideration (indicated here with A0, A1, A2, A3, A4), three histograms were constructed corresponding to three distinct windows positioned respectively in a region of the lipid plaque (FIG. 10), in a free region of the vessel, that is, filled with blood (FIG. 11) and in a region subject to calcification (FIG. 12). It can be seen from the histograms in FIG. 11 that distribution of the coefficients of all degrees is very narrow in the free region of the vessel. The relative distribution histograms have extremely limited dispersion. On the contrary, in the regions affected by lipid plaque and calcification (FIGS. 10 and 12), the second order coefficient (A2) in particular has essentially different statistical distribution compared with that of the same coefficient in healthy tissue (blood, FIG. 11) and, moreover, essentially different in the two cases of lipid plaque and calcification. In other terms, by analyzing the variation of the histograms representing the statistical distribution of the second order coefficient, it is possible to distinguish whether the region examined contains a free vessel (blood, FIG. 11), lipid plaque (FIG. 10) or calcification (FIG. 12).

This means that lipid plaque and calcification introduce different spectral modifications in the back-propagated signal, which can be detected using qualitative evaluation of the distribution histogram of the second order coefficients of the interpolating polynomial which approximates the variation of the spectral coefficients.

Analogous considerations can be made regarding the variation of the histogram relating to the third order coefficient, which has a different distribution in the three windows taken into consideration, centered respectively on lipid plaque, blood and calcification. The histograms relating to distribution of the first order coefficient differ to a lesser, although still significant, extent.

Figure 13A:
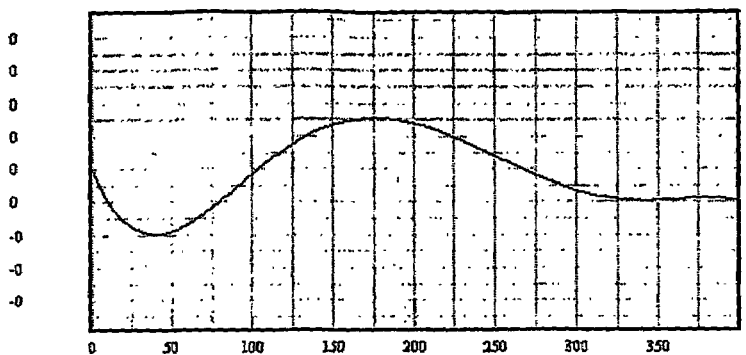
FIGS. 13A-13C show the variation of the fifth order interpolating polynomials obtained by the same application as in FIGS. 9A-9C.
Figure 13B:
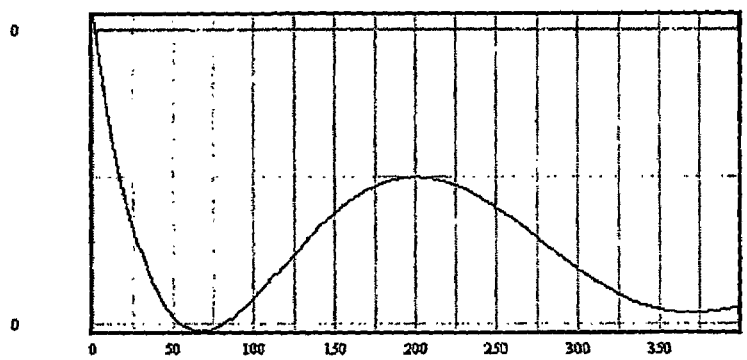
Figure 13C:
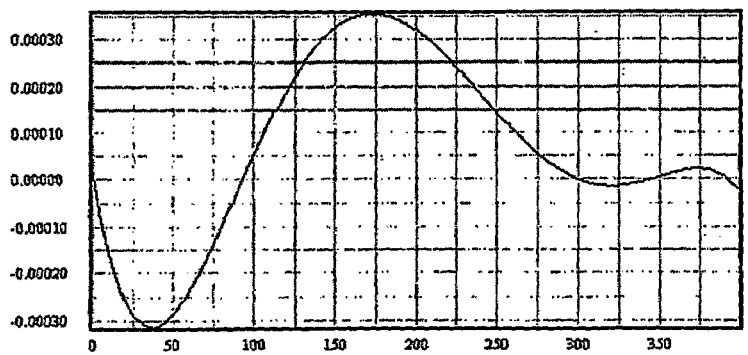

Using a decoding into a high number of bands, sixteen in the example of the data indicated in these figures, use can be made of interpolating polynomials of a degree higher than the fourth, for example a fifth order interpolating polynomial. From this, even more significant experimental results are obtained relative to the statistical distribution of the various coefficients. FIGS. 13A, 13B and 13C show the variations of the fifth order interpolating polynomials which approximate the variation of the spectral coefficients in the case of the carotid artery, obtained with a decoding into sixteen sub-bands using a biorthogonal 3.7 wavelet.

Figure 16:
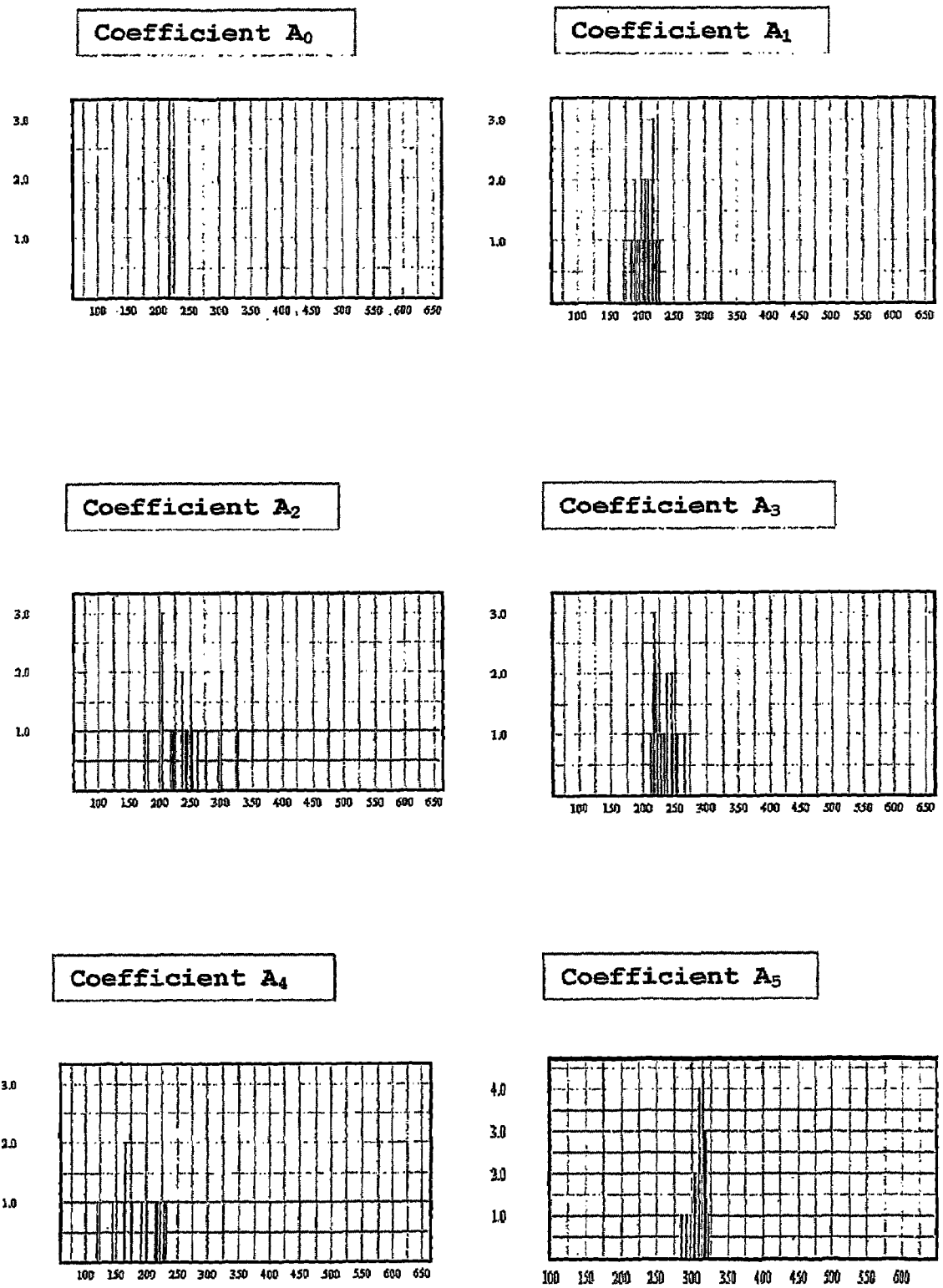

FIGS. 14, 15 and 16 show the histograms representing the statistical distribution of the coefficients (A0-A5) of the various orders of the interpolating polynomial for the same windows indicated in FIG. 8A, centered respectively: on the lipid plaque, on the blood and on a region affected by calcifications.

By comparing FIGS. 9A, 9B, 9C and 13A, 13B, 13C a different variation of the interpolating polynomial can be observed especially in the lipid plaque and calcification region. A different variation of the histogram of the coefficients of the interpolating polynomials in the various regions corresponds to this, with an even greater difference in statistical distribution between the various types of tissue than the difference found in the histograms relating to the fourth order polynomial.

Figure 8B:

Similarly interesting results were obtained in the ultrasound examination of the prostate gland. The B-mode ultrasound image used to obtain the experimental results set forth and discussed below is shown in FIG. 8B. It also indicates the window centered on the region of tumoral tissue examined.

Figure 17A:
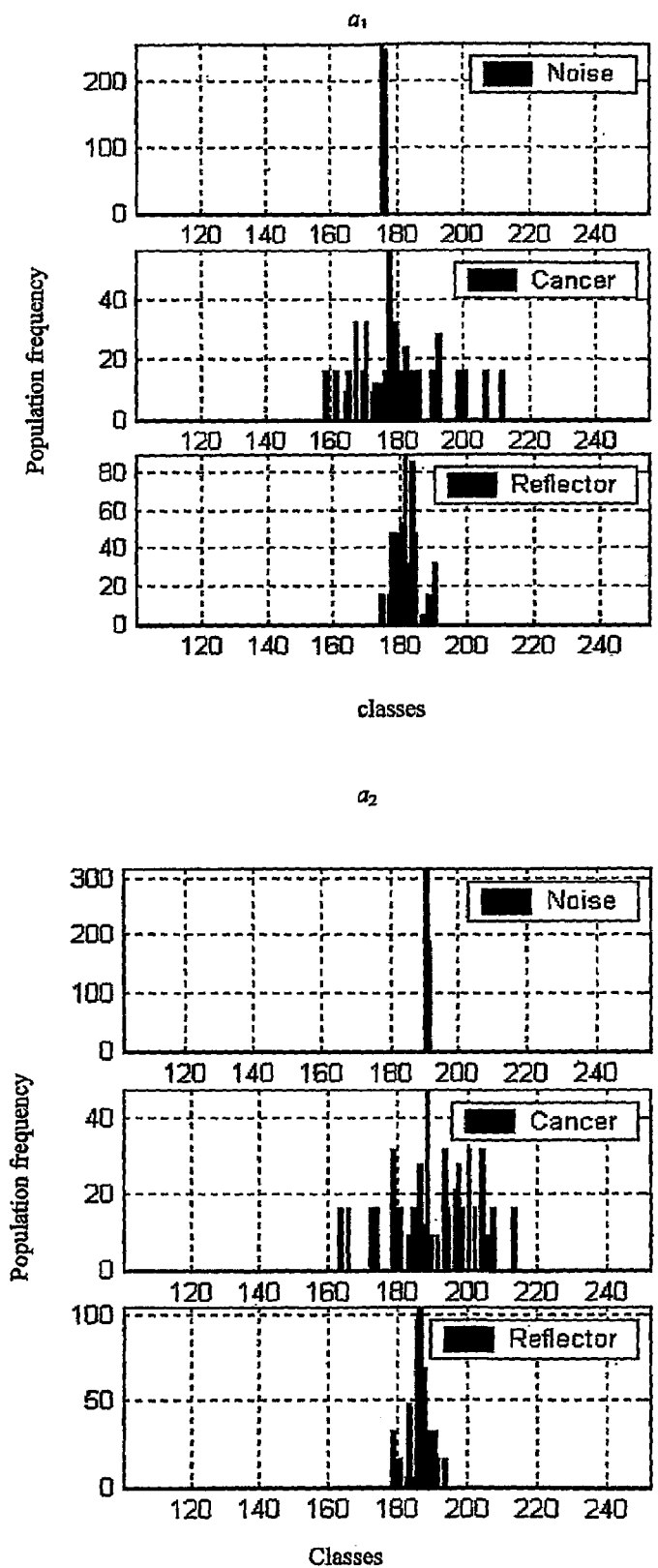
Figure 17C:
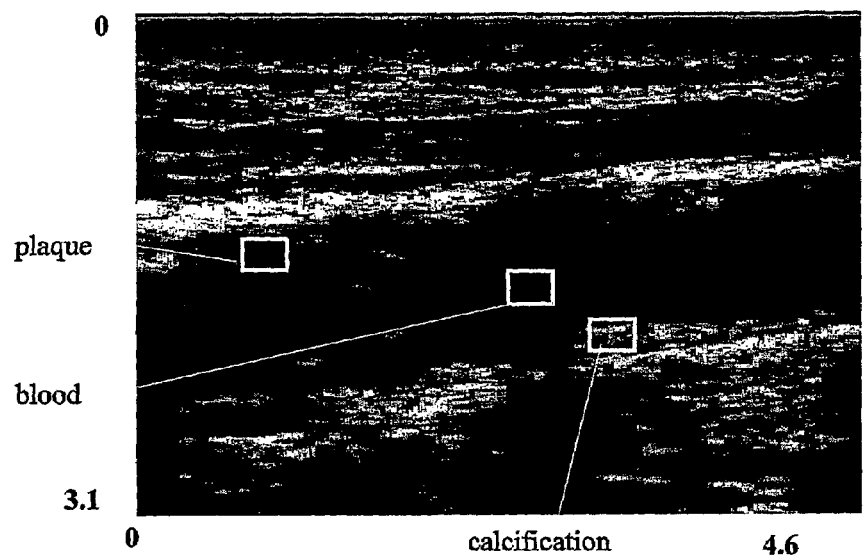
FIGS. 17C and 17D show ultrasonic images respectively of the carotid artery and prostrate.
Figure 17D:
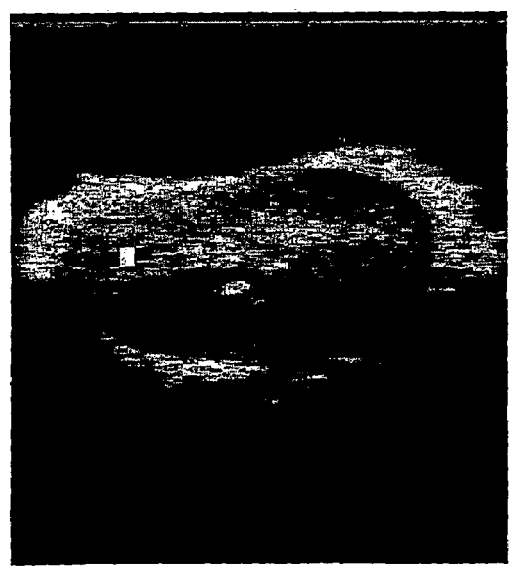

Also in the case of the prostate, using a fourth order interpolating polynomial and a decoding of the digitized radio frequency signal into sixteen bands or sub-bands, a statistical distribution of the first, second, third and fourth order coefficients of the interpolating polynomial is noted, which differ between healthy tissue and neoplastic tissue, also for the shape of the distribution histograms. FIGS. 17A and 17B show the population frequency histograms of the various classes of reference for the coefficients a1 and a2 (FIG. 17A) and for the coefficients a3 and a4 (FIG. 17B) respectively of the first, second, third and fourth order, both for the tumoral tissue and for the healthy tissue, and moreover in the case of absence of tissue (noise measured in a sample of water). By comparing the histograms, it can be seen that all the coefficients provide information useful for identification of the tumoral tissue, as the forms of the histograms of the various coefficients change between healthy and neoplastic tissue for all four coefficients.

These experimental results show on the one hand the relevance (for the purposes of spectral analysis) of different coefficients of the interpolating polynomial, and on the other the importance of the shape factor of the distribution histograms in the various classes of value of the local estimators for the purpose of identification of tumoral tissues or in any case of particular characteristics in the organs under examination.

Therefore, according to a first aspect, according to the method of the present invention shape factors of the distribution histograms of one or more of the coefficients of the interpolating polynomial are used to obtain an information that can be represented overlaid on the normal B-mode image of the ultrasound scanner.

According to a different aspect, the method of the present invention is characterized by the (combined) use of several local estimators, that is, of several coefficients of various orders of the same interpolating polynomial.

Figure 7G:
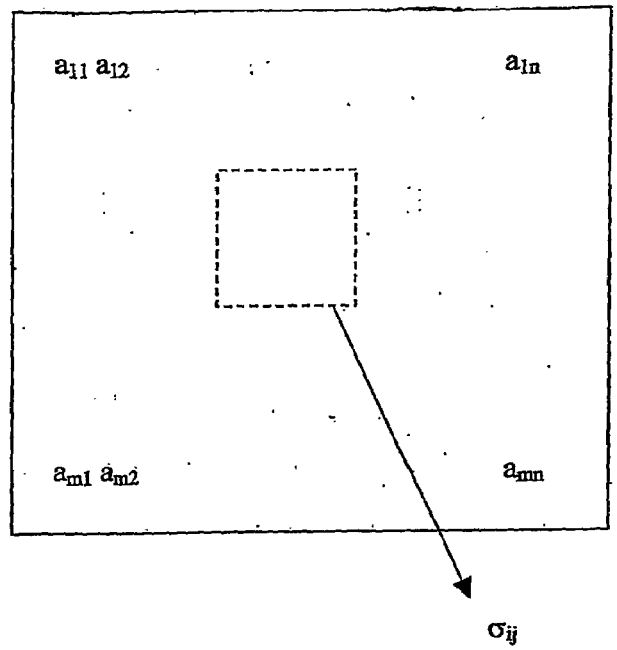
Figure 7H:
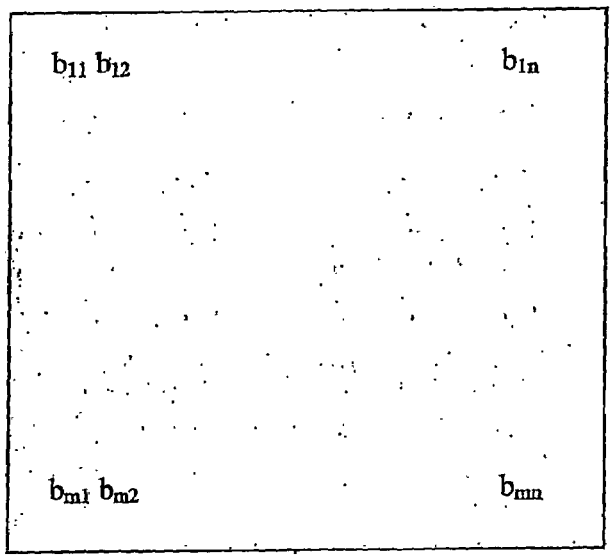

A possible processing method is described below with reference to FIGS. 7G-7I. The example considers a single matrix of local estimators, that is, the values of a single coefficient of the interpolating polynomial. The matrix of local estimators taken into consideration can be the one relative to any of the coefficients of the interpolating coefficient, which was significant in the investigation of the type of tissue under examination. The procedure described below can be repeated for each of the matrices of local estimators of interest, each matrix being obtained by collecting the values taken, in the ultrasound image, by a specific coefficient of the interpolating polynomial. It would also be possible to start with a matrix of local estimators composed of a combination of matrices relative to coefficients of a different order of the same polynomial. For example, it would be possible to produce a matrix of local estimators which collects the second order coefficients and a different matrix of local estimators which collects the third order coefficients and then from these a matrix of local estimators in which each coefficient is the sum of the homologous coefficients of the first two matrices mentioned. In a different embodiment, it would be possible to use, as local estimators, the products of the local estimators collected in two or more matrices of local estimators. It would also be possible to use all the coefficients of the interpolating polynomial. In the case of a fourth order polynomial, it would be possible to combine five coefficients (adding or multiplying them, or subjecting them to another type of processing) to obtain a single matrix from the five matrices.

Returning to the example illustrated, which uses a single coefficient of the interpolating coefficient and therefore a single matrix, starting from the matrix of the local estimators in FIG. 7F, the distribution histogram of the values of the local estimators is determined in various classes of reference.

A window with suitably defined dimensions I×J is made to move over the matrix of the local estimators taken into consideration. The window is positioned in a first position (FIG. 7G) and the distribution histogram of the coefficients $a_{ij}$ of the matrix of local estimators which fall within the window is calculated in this position.

As was mentioned with reference to FIG. 10 and following, relative to the experimental results, the distribution histograms of the coefficients of various orders of a given polynomial vary to take different shapes depending on the type of tissue found in the specific portion of image examined, enclosed by the window. Once the investigation window with dimensions I×J has been positioned in a given position on the matrix of the local estimators, the distribution histogram is performed and a shape factor, for example the standard deviation σ, of the histogram is calculated. By moving the window one step at a time both along the rows and along the columns of the matrix of local estimators, a series of standard deviation values equal to the number of coefficients of the matrix of local estimators is obtained. By indicating with $\sigma_{ij}$ the value of the standard deviation relating to the distribution histogram of the coefficients of the matrix of local estimators calculated with the window in the position ij, it is possible to construct a matrix with a number of coefficients equal to the number of coefficients $a_{ij}$ of the matrix of local estimators, but the value of which has been modified and processed taking into consideration the shape parameter (in the specific example the "standard deviation $\sigma_{ij}$) of the distribution histogram. This matrix will be composed of m×n values $b_{ij}$ $$b_{ij}=f(a_{ij},\sigma_{ij})$$

where f is a generic function of $a_{ij}$ and $\sigma_{ij}$. For example, each coefficient $a_{ij}$ of the matrix of local estimators could by divided by the corresponding value of $\sigma_{ij}$ obtaining:

$$b_{ij}=a_{ij}/\sigma_{ij}$$

It must, however, be understood that the type of function that relates the coefficients $b_{ij}$ to the coefficients $a_{ij}$ and to the shape factor $\sigma_{ij}$ of the corresponding distribution histogram may differ from the one indicated. For example, it would be possible to perform a multiplication rather than a division, or a different combination of these values.

Moreover, it would also be possible to consider for a plurality of coefficients of different orders of the interpolating polynomial a corresponding plurality of matrices of local estimators and to combine these together, weighting them with the shape parameters of the relative distribution histograms.

The shape factor or shape parameter of the histogram which is used can also differ from the standard deviation. For example, it would be possible to use the kurtosis, the symmetry index, higher degree moments or a parameter indicative of the most populated classes. In general, the coefficients of the matrix of the local estimators could be processed with any shape parameter characterizing the distribution histogram of the coefficients of said matrix in a specific window, for example centered on the position of each individual coefficient of the matrix of local estimators.

The matrix of dimension m×n which collects the coefficients $b_{ij}$ is hereunder called matrix of weighted local estimators. This means that each coefficient of said matrix has been "weighted" by a shape factor of the distribution histogram of the corresponding window, where "weighted" is intended as the fact that this coefficient has been combined in some way with a shape parameter, such as standard deviation or another suitable parameter.

It must be understood that the operation described may be performed separately for all or for some of the coefficients of the various orders of the interpolating polynomial which are useful for spectral characterization of the ultrasonic signal. The operation performed on the individual matrix of the local estimators which collects the coefficients of a generic order of the interpolating polynomial can be the same for all the orders taken into consideration, although it would also be possible to process the coefficients of the various orders of interpolating polynomial in different ways. For example, the third order coefficients could be weighted by dividing by the parameter of standard deviation, while the second order coefficients could either be weighted, or another operation of combination with a different parameter, such as kurtosis, or an operation differing from dividing the local estimator and the shape parameter could be performed.

In any case, the general concept is to combine the value of the coefficients representing the local estimator with a coefficient that takes into account the shape of the distribution histogram of said coefficients in a specific window.

Figure 7J:
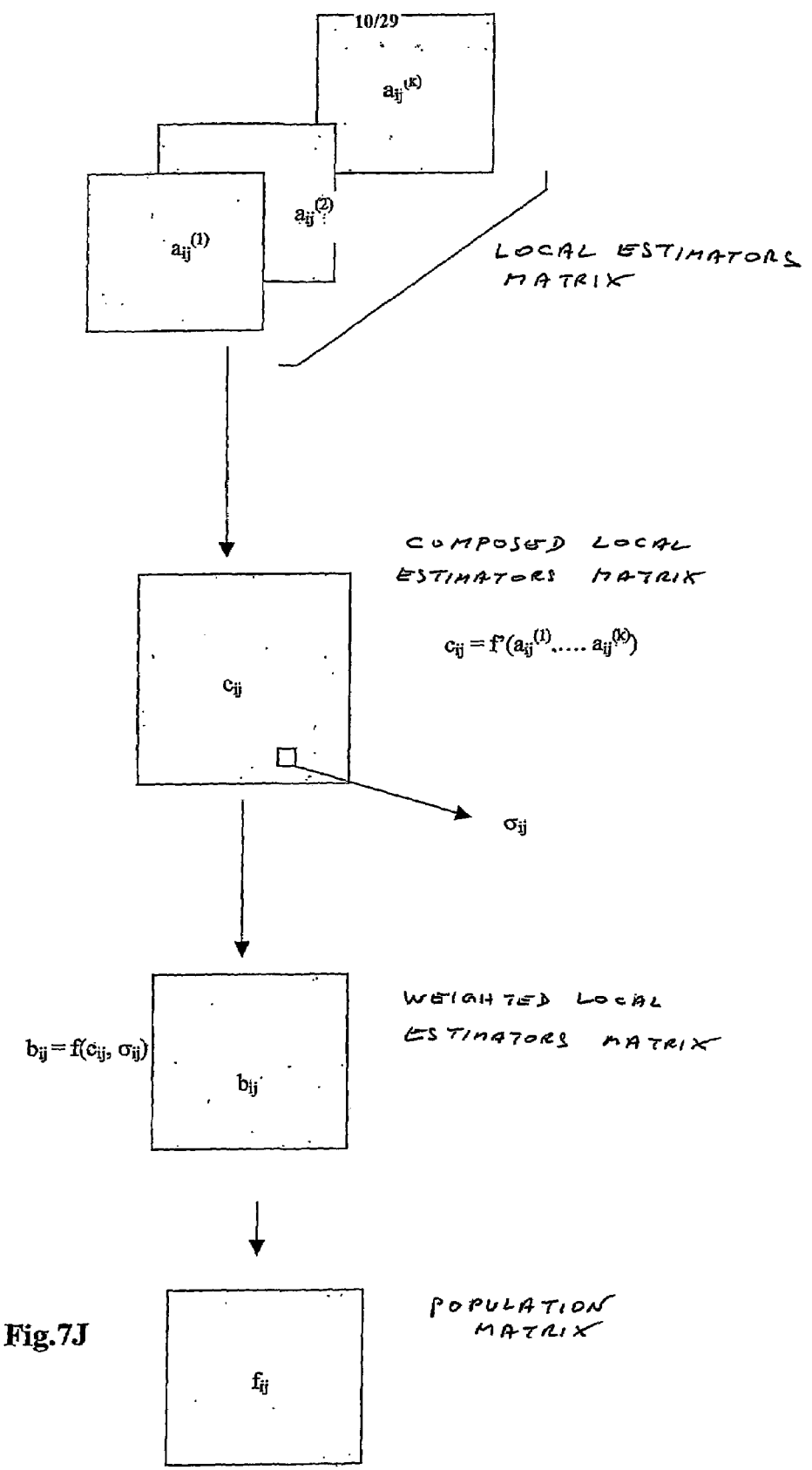
FIGS. 7J, 7K schematically show modified embodiments of the processing procedure according to the inventions.

FIG. 7J schematically indicates the procedure which can be performed when, instead of a single coefficient of the interpolating polynomial, all the coefficients of said polynomial are used to obtain a more complex and elaborate set of weighted local estimator. The matrix of the local estimators is therefore a three-dimensional matrix with dimensions m*n*k, where m is the number of samples per track, n is the number of tracks in the digitized and sampled ultrasound frame and k is the number of coefficients of the interpolating polynomial (polynomial of degree k−1). The coefficients of the matrix are indicated with $a_{ij}^{(1)}, \ldots a_{ij}^{(k)}$.

The coefficients $a_{ij}^{(1)}, a_{ij}^{(2)}, \ldots a_{ij}^{(k)}$ are combined with one another to obtain a coefficient $c_{ij}$ of a composed local estimators matrix. This matrix is a two-dimensional matrix with dimensions n*m. Each of its coefficients is given by $$c_{ij}=f(a_{ij}^{(1)},a_{ij}^{(2)},\ldots a_{ij}^{(k)})$$

with f generic function. For example, it may be a summation or a product of all the k coefficients of position ij of the three-dimensional matrix.

On this matrix $c_{ij}$ the shape coefficients $\sigma_{ij}$, for example the standard deviation, of the distribution histograms are calculated by means of the procedure described above with reference to FIGS. 7G, 7H. The matrix of the weighted local estimators, again indicated with $b_{ij}$, and from this the population matrix $f_{ij}$, are obtained from the shape coefficients $c_{ij}$ and from the shape parameters $\sigma_{ij}$.

The procedure is similar in concept to the one described with reference to FIGS. 7D-7H, although with the difference that coefficients (weighted local estimators) which contain information deriving from all the coefficients of the interpolating polynomial, instead of only one of these, are contained in the final matrix.

Intermediate solutions, in which only some of the coefficients of the interpolating polynomial are used, are also possible.

In a variant of embodiment, it would be possible to first perform weighting of the individual coefficients $a_{ij}$ through the shape coefficient $\sigma_{ij}$ and only subsequently combine the weighted local estimators with one another. Essentially, in this case after determining the matrix of the spectral coefficients the interpolating polynomials are determined and from their coefficients the matrix of the estimators $a_{ij}^{(k)}$. For each value of k the statistical distribution, that is, the shape of the histograms, is determined and a shape factor, for example the standard deviation $\sigma_{ij}^{(k)}$, is calculated. The weighted local estimators are then calculated $$b_{ij}^{(k)}=f(a_{ij}^{(k)},\sigma_{ij}^{(k)})$$

Finally, the weighted local estimators are combined to obtain $$c_{ij}=f'(b_{ij}^{(1)},\ldots b_{ij}^{(k)})$$

where f and f' are generic functions.

Figure 7K:
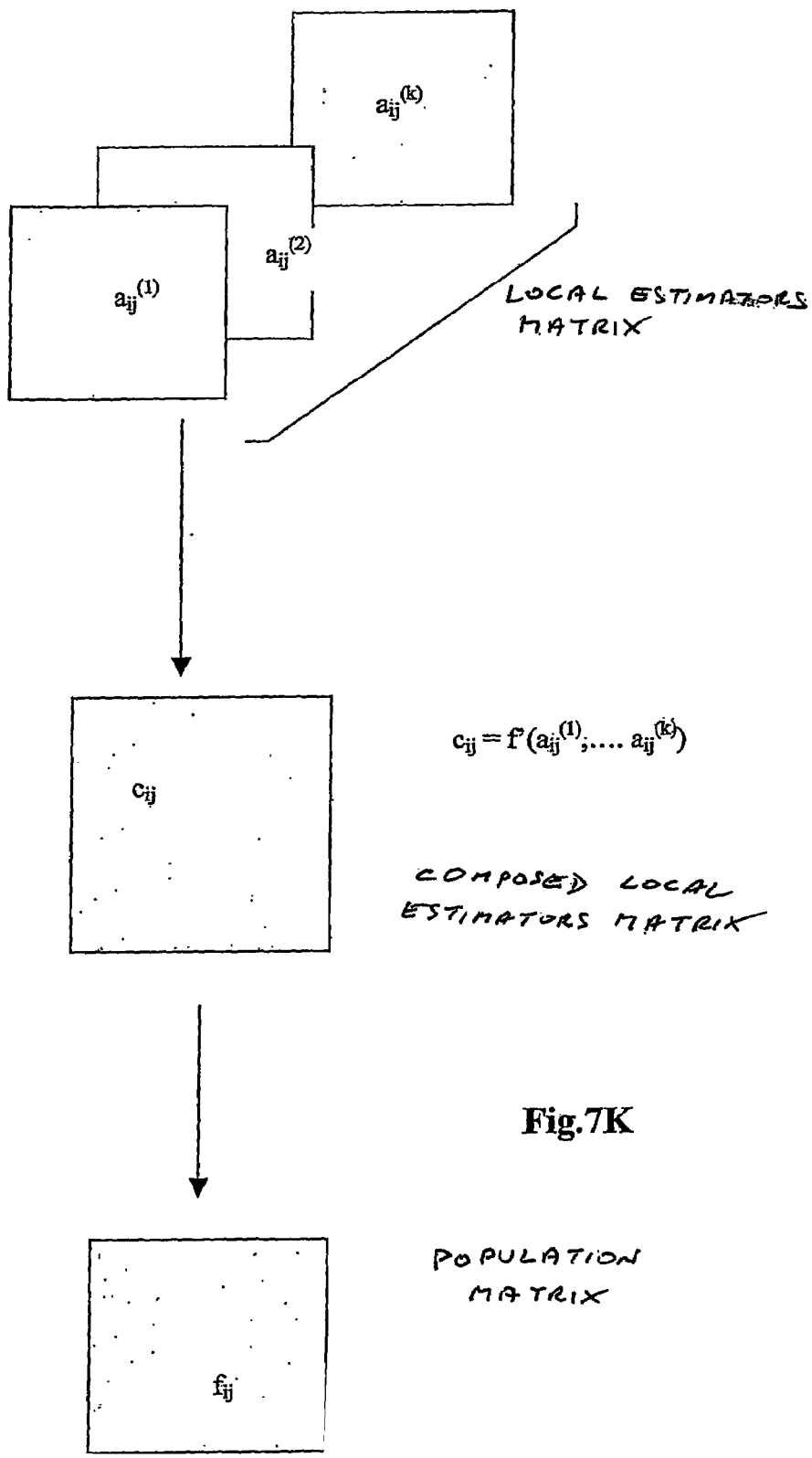

According to a different aspect of the invention, the procedure does not weight the coefficients or local estimators. This different embodiment of the procedure does not allow the use of information contained in the shape of the distribution histograms, but still allows the use of the information content of several coefficients of the interpolating polynomial. FIG. 7K schematically represents the processing procedure in this case. Identical symbols indicate identical or equivalent elements to those in FIG. 7J. The matrix $c_{ij}$ is no longer processed to obtain the shape factor $\sigma_{ij}$, but its coefficients (local estimators, not weighted) are subjected to statistical analysis to directly obtain the population matrix, indicated here with $f_{ij}'$.

Having obtained the matrix of the weighted local estimators, the values of the coefficients of this matrix are classified according to classes of values which have been found, experimentally, to be related bi-univocally to a specific tissue structure. In other terms, it is experimentally proven that a certain type of tissue (for example the neoplastic tissue of the prostate) modifies the ultrasonic excitation signal so that a certain weighted local estimator takes values that fall within a certain class of values. The ultrasound scanner is then programmed to perform, on an input frame, the operations described above to obtain the matrix of weighted local estimators. The coefficients of the matrix thus obtained are then compared with the class of values characteristic of the neoplastic tissue and a color image formed of points of the matrix of the weighted local estimators, the values of which fall within the characteristic class of the neoplastic tissue, is overlaid on the black and white B-mode image. This color indication provides the ultrasound operator with the required information, showing the presence and position of the neoplastic tissue.

It is understood that classification can be performed for various types of tissue or structure. For example, if it is desired to show the presence of healthy tissue, it is enough to identify the class of values of a certain weighted local estimator which is characteristic of the presence of healthy tissue. Likewise, when it is desired to simultaneously or sequentially show on the same image the presence of two different types of tissue or structure (for example lipid plaque and calcification in the carotid artery), it is enough to identify the two classes of values which characterize these two types of structure and then filter the coefficients of the matrix of the local estimators with the characteristic values of these classes and present the result simultaneously or sequentially on the B-mode ultrasound image, if necessary and preferably with two different colors.

To experimentally identify the classes of values which for a certain local estimator characterize a specific type of tissue, it is possible to proceed by examining an experimental sample in which the structures of interest are identified by means of histological analysis. In the case of the prostate, for example, the homogeneous regions of healthy tissue, adenocarcinoma and adenofibroma are identified. The radio frequency ultrasonic signal, obtained in response from scanning of the experimental sample, as described above, is then processed to obtain a single matrix of weighted local estimators.

Due to the way in which the matrix of local estimators has been obtained, a point of the B-mode image corresponds to each coefficient of the matrix. Therefore, as the region is known, in which a certain structure (for example the adenocarcinoma) is localized, statistical distribution of the local estimators is determined in these regions and the class with the greatest population frequency is identified. That class will be associated, for that specific organ, with the presence of adenocarcinoma. Therefore, each time an ultrasound analysis is performed on an analogous organ, the weighted local estimators will be classified and those falling within the class of reference of the adenocarcinoma will be highlighted by overlaying a color scale on the B-mode image in which the pixels, corresponding to the regions of the image in which the values of the weighted local estimators fall within the characteristic class of the adenocarcinoma, are colored. An analogous procedure will be used for the other types of tissue (healthy tissue, adenofibroma, in the case of the prostate).

More detailed processing envisages working on at least one pair of matrices of local estimators both in the phase to identify the classes of reference, and in the phase to analyze an organ subjected to ultrasound investigation. One example of processing of this type, based on three distinct local estimators, is now described with the aid of FIGS. 23A and 23B. Acquisition of an ultrasound frame is once again performed on the experimental sample, which is then processed as described above to obtain the three matrices of weighted local estimators.

A first two-dimensional graph shows, respectively on the abscissas and on the ordinates, all the values of the coefficients of two matrices of weighted local estimators, for example those obtained by order 0 and order 1 coefficients of the interpolating polynomial. A second graph shows the weighted local estimators obtained by the order 0 and order 2 coefficients. FIG. 23A shows, on the abscissas, the coefficients of the matrix of weighted local estimators obtained by the first order coefficients of the interpolating polynomial for a prostate. The coefficients of the matrix of weighted local estimators obtained by order 0 coefficients of the same polynomial are shown on the ordinates. FIG. 23B shows, on the abscissas, the weighted local estimators obtained by second order coefficients and, on the ordinates, those obtained by order 0 coefficients.

Therefore, a pair of values (the coordinates of the point), composed by the value of one and of the other of the weighted local estimators used, is associated with each point of each of the two graphs.

The graphs obtained in this way can be overlaid on the input ultrasound frame. Therefore, it is possible to associate with each point of the input ultrasound frame pairs of classes of values of the weighted local estimators examined and corresponding to this point.

By means of histological analysis, the regions of the tissue which are homogeneous in nature (healthy, neoplastic, etc.) are identified on the ultrasound frame. In FIGS. 23A and 23B these regions are distinguished by three different shades of grey. As a pair of values of the weighted local estimators correspond, in both graphs, to each point of the ultrasound frame, it is possible to associate a class of values for said weighted local estimators, with each homogeneous region of the tissue examined, said class being univocally associated with that specific type of tissue.

In order to identify each region bi-univocally, it is important to select a set composed of pairs or triplets of classes of values of the weighted local estimators, that are not overlaid on any other associated with a different region. The operation to extract these sets can be performed through, for example, OR and AND logic operations, As mentioned, the population frequency of the sets thus identified is represented with a color scale, different for each set, on the conventional B-mode image and is directly proportional to the intensity of the population frequency.

Experimentally, as can also be noted in FIGS. 17A, 17B, the regions which is desired to show (in the example the neoplastic tissue) can normally be highlighted by combining simply with a sum the images obtained from all the coefficients of the interpolating polynomial, which can be highlighted by combining, in this case, with an AND operation the sets of values obtained from all the coefficients of the interpolating polynomial.

The procedure described above for experimental correlation between tissue characteristics detected by histological analysis and classes of values for the weighted local estimators is also valid in the case of non-weighted local estimators, for example obtained by combining different degree coefficients of the interpolating polynomials with one another.

In the experimental results discussed above and indicated in FIGS. 9A-17B, decomposition of the RF signal into sixteen bands or sub-bands of the same width was used. This decomposition provided useful results both in examination of the prostate, and in examination of the carotid artery. These two types of organ were chosen as they have tissue structures with different dimensions. The prostate gland typically has structures with dimensions larger than the carotid artery. The different dimension of the structures that reflect the ultrasonic excitation signal cause different distribution of the frequencies in the return signal. Subdivision into sixteen bands of the same amplitude makes it possible to obtain a sufficiently significant resolution of the RF signal returned from both the organs examined.

Nonetheless, in general it will be understood from the above description that the choice of decomposition into bands (number and amplitude of bands) may differ according to the type of tissue or structure to be analyzed. The smaller the structures to be studied in the analyzed organ are, the greater the resolution of decomposition into high frequencies will be, and vice versa. This is confirmed by the experimental results discussed below with reference to FIGS. 18 to 21, obtained again from processing an ultrasound image of a portion of carotid artery.

Figure 18A:
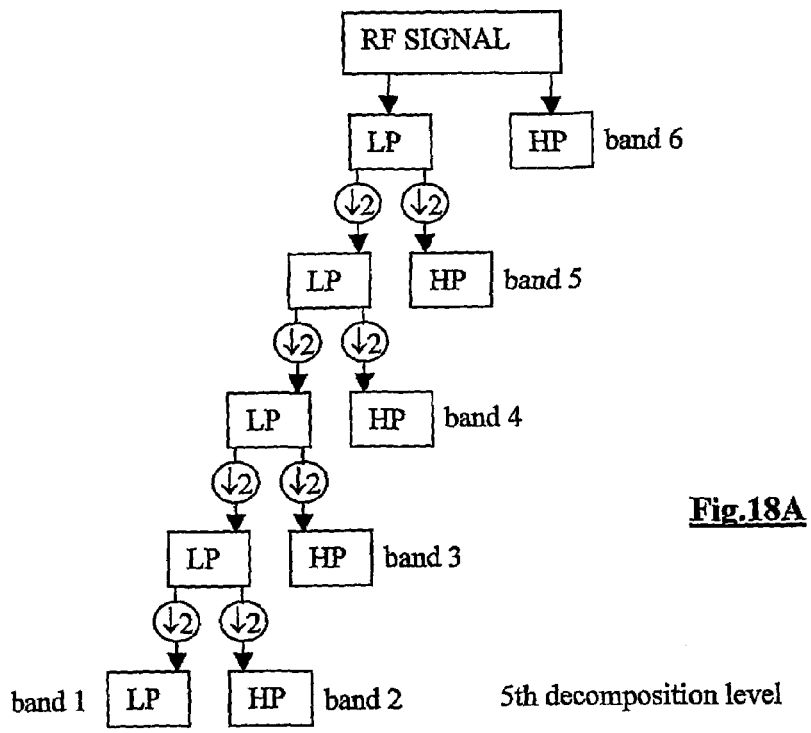
FIG. 18A shows a block diagram of a cascade of filters for decomposition of the digitized and sampled radio frequency signal into six bands or sub-bands by means of a discrete wavelet, in bands with variable amplitude, with increased subdivision in the low frequency regions.
Figure 18B:
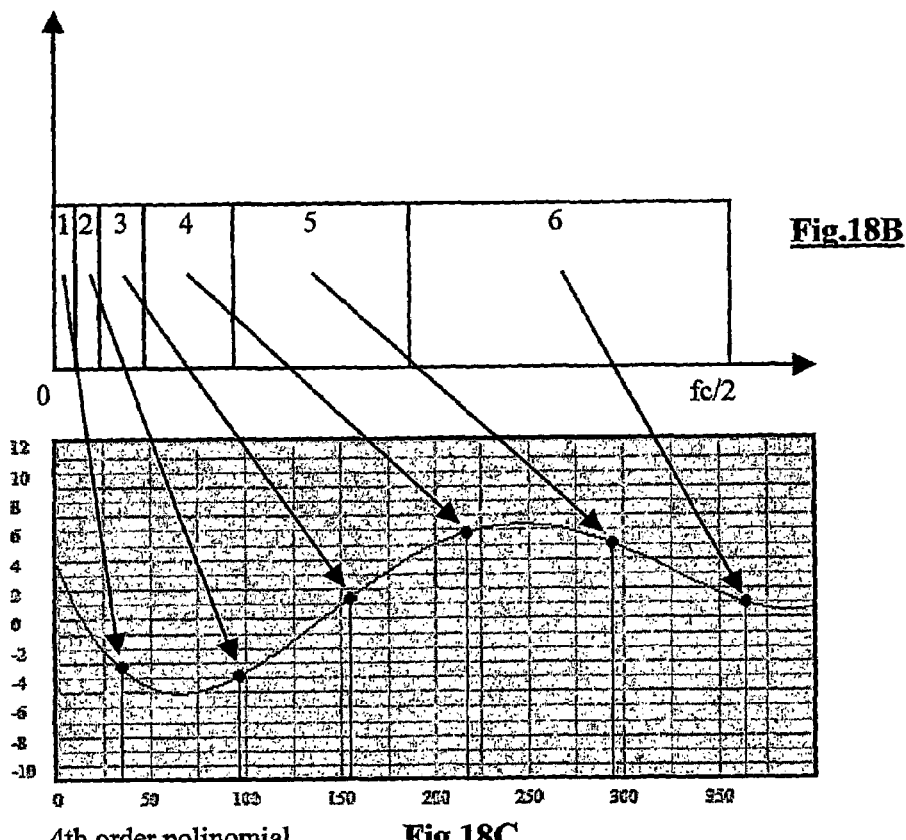
FIG. 18B schematically shows the six decomposition bands.

FIGS. 19, 20 and 21 show the B-mode image of the portion of carotid artery analyzed. The digitized and sampled RF signal was decoded using a discrete wavelet into six bands of variable amplitude. FIG. 18A shows the tree representing the filter process used and FIG. 18B shows the six decomposition bands. It can be observed that the amplitude of the bands increases from low frequencies to high frequencies. The sampling frequency of the signal is indicated with fc. FIG. 18C shows the variation of the interpolating polynomial obtained applying the aforesaid decomposition to the B-mode image in FIGS. 19, 20 and 21.

FIG. 19 shows, in the top part, the B-mode image of the carotid artery examined, below this the variation of the fourth order interpolating polynomial (corresponding to FIG. 18C) and subsequently the distribution histograms of the coefficients A0-A4 of the various degrees of interpolating polynomial, calculated at the level of a window (shown overlaid on the B-mode image) centered on the lipid plaque. FIG. 20, with the same layout of the images, shows the interpolating polynomial and the distribution histograms obtained in a window centered on the free region of the vessel, that is, on the blood. Also in this case the window is shown overlaid on the B-mode image of the carotid artery. Finally, FIG. 21 shows, with the same disposition, the result obtained in a window centered on a portion of the B-mode image in which calcification phenomena are recognized.

By comparing FIGS. 19, 20 and 21 it can be seen that with decomposition into six bands of amplitude increasing from the low to the high frequencies, the variation of the interpolating polynomial does not change appreciably in the three regions observed (lipid plaque, blood and calcifications). This is a first indication of the fact that the decomposition used does not provide resolution appropriate for examination of this type of organ. This is due to the fact that the dimensions of the structures to be recognized are small and, therefore, the spectral information they supply is located at the high frequencies of the response spectrum, that is, where the decomposition used requires bands with a greater amplitude. Contrary to this, the results obtained on the same organ with decomposition into sixteen bands of the same amplitude (FIGS. 9A to 16) show that the resolution obtained with this decomposition is sufficient to provide significant results.

From the distribution histograms in FIGS. 19, 20 and 21 it can be noted that in fact (although the variation of the interpolating polynomial is essentially the same in the three regions of lipid plaque, blood and calcification) the shape of the distribution histograms of the various orders of coefficients changes. Nonetheless, the difference between distribution histograms of homologous coefficients in the three investigated regions is not as marked and significant as the difference obtained using signal processing based on decoding into sixteen bands of identical amplitude. In conclusion, comparison of the results obtained with the two types of decoding into sub-bands shows that the choice of suitable decoding, with regard to number of bands and their amplitude, allows the method of analysis of the present invention to be adapted to obtain optimal results according to the type of tissue or structure investigated. The type of decoding or decomposition can be selected experimentally, as can the most suitable degree of the interpolating polynomial, its most significant coefficients and the most relevant shape coefficients of the distribution histograms of said coefficients.

Figure 22:
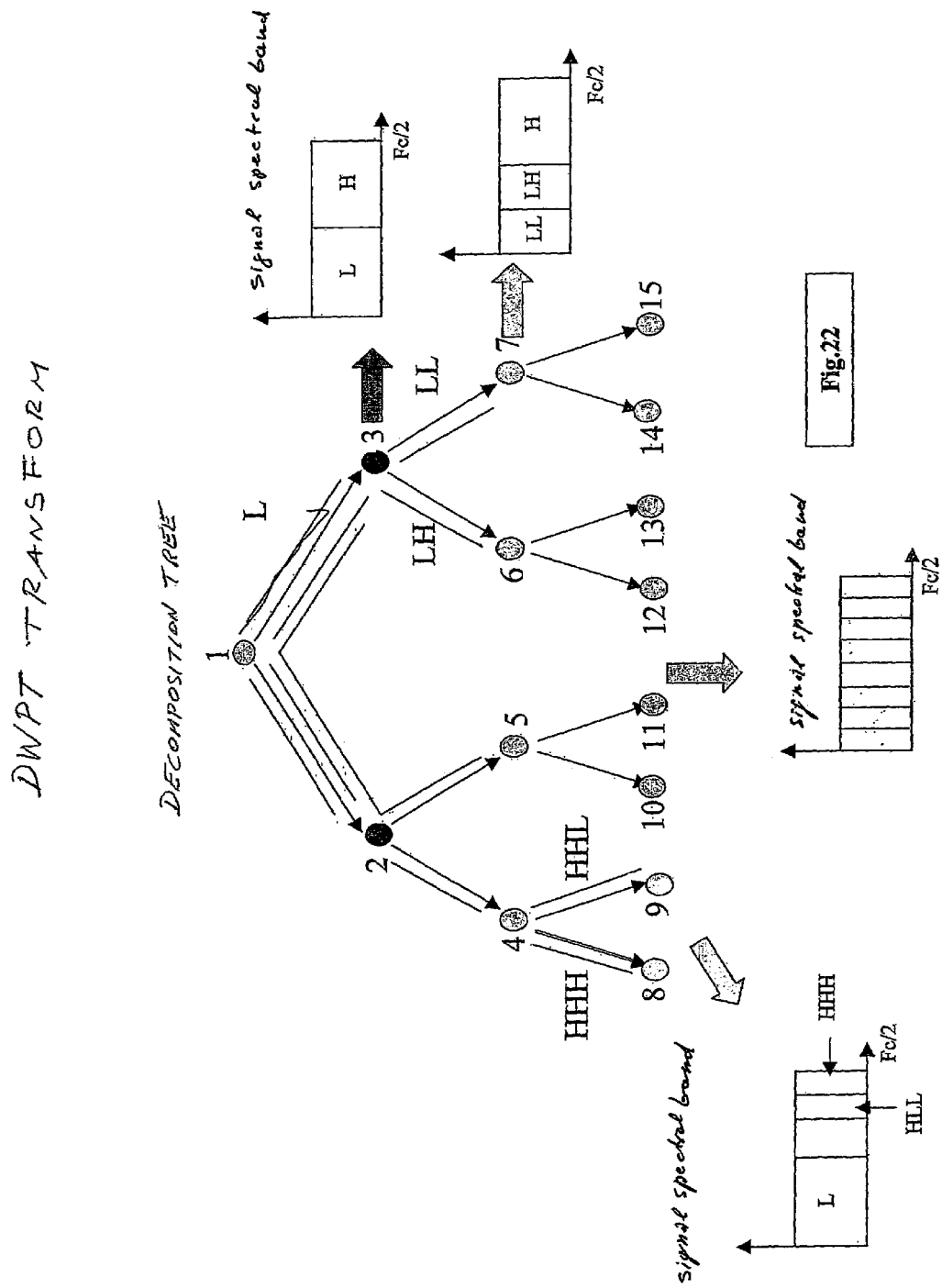
FIG. 22 shows a structure of the decomposition tree obtained by a DWPT transform.

FIG. 22 shows as an example a decomposition tree of the spectrum of the radio frequency signal by the Discrete Wavelet Packet Transform (DWPT). According to the type of ultrasound investigation to be performed and to the characteristics of the examined structure, the investigation method can use any one of the various decomposition possibilities along the tree in FIG. 22.

Clearly, the drawing shows only one practical embodiment of the invention, which can be varied in its forms and arrangements without departure from the scope of the principle of the invention. The presence of any reference numbers in the attached claims has the sole purpose of facilitating reading with reference to the preceding text and the attached drawings, and does not limit the scope of protection of the claims.

The invention claimed is:

1. A method of spectral analysis of a radio frequency ultrasonic signal returned from a structure subjected to an ultrasound examination, comprising the phases of:
    a) transmitting an ultrasonic excitation signal to a portion of said structure subjected to examination;
    b) receiving a radio frequency response signal from said structure;
    c) applying a sequence of filtering operations to obtain decomposition of the band of the radio frequency response signal into a plurality of frequency bands;
    d) from the coefficients resulting from said filtering operation, calculating local estimators, containing information on the spectrum of the radio frequency signal, wherein said local estimators are combined with parameters representative of the shape of a statistical distribution of said local estimators into a portion of an ultrasound image.

2. A method as claimed in claim 1, wherein the frequency bands into which said radio frequency signal is subdivided cover the entire frequency band of the signal.

3. A method as claimed in claim 1, wherein said frequency bands are bands of different width and position.

4. A method as claimed in claim 1, comprising the phases of:
    for an ultrasound input frame, producing a sampled and digitized frame;
    decomposing said sampled and digitized frame into said frequency bands;
    producing a matrix of spectral coefficients containing the coefficients resulting from said filtering operation or coefficients deriving therefrom;
    determining, for at least some of the points of the sampled and digitized frame, respective interpolating polynomials which approximate the variation of said spectral coefficients in the various bands into which the radio frequency signal was decomposed;
    for said points, obtaining said local estimators from at least one of the coefficients of the interpolating polynomial, said local estimators constituting a matrix of local estimators.

5. A method as claimed in claim 4, wherein each of said local estimators is constituted by one of the coefficients of the respective interpolating polynomial.

6. A method as claimed in claim 4, wherein at least two local estimators are determined for each point on the basis of at least two coefficients of the interpolating polynomial, to produce a three-dimensional matrix of local estimators.

7. A method as claimed in claim 4, wherein each of said local estimators is constituted by a combination of a plurality of coefficients of the corresponding interpolating polynomial.

8. A method as claimed in claim 4, wherein each of said local estimators is combined with a shape coefficient of a distribution histogram of said local estimators in a window inside which said local estimator is contained, to obtain a weighted local estimator.

9. A method as claimed in claim 8, comprising the phases of:
    determining a statistical distribution of said local estimators in windows with dimensions smaller than the dimension of said matrix of local estimators;
    determining a shape parameter characteristic of said statistical distribution for each of said windows;

for each window, combining said shape parameter with a corresponding local estimator to obtain a weighted local estimator.

10. A method as claimed in claim 1, wherein said filtering operations are obtained using a time-frequency transform.

11. A method as claimed in claim 10, wherein said time-frequency transform is a wavelet.

12. A method as claimed in claim 10, wherein said time-frequency transform is a Discrete Wavelet Packet Transform (DWPT).

13. A method as claimed in claim 1, comprising the phase to determine statistical distribution of the weighted local estimators and to create a set of classes of values capable of bi-univocally identifying homogeneous portions on the ultrasound frame of the investigated sample.

14. A method as claimed in claim 1, wherein color images produced using said weighted local estimators are overlaid on an ultrasound image.

15. A method as claimed in claim 14, wherein said color images are produced selecting the weighted local estimators that fall within classes of reference, bi-univocally related to predetermined tissue structures.

16. A method as claimed in claim 4, wherein several weighted local estimators obtained for the same point of the sampled and digitized ultrasound frame using different coefficients of the respective interpolating polynomial are combined with one another.

17. An ultrasound device comprising an ultrasound probe, means to acquire and process a radio frequency return signal from a structure subjected to ultrasound examination, characterized in that said acquisition and processing means are programmed to carry out a method as claimed in claim 1.

18. A method of spectral analysis of a radio frequency ultrasonic signal returned from a structure subjected to an ultrasound examination, comprising the phases of:
    a) transmitting an ultrasonic excitation signal to a portion of said structure subjected to examination;
    b) receiving an input radio frequency response signal from said structure;
    c) for an input ultrasound frame, producing a sampled and digitized frame;
    d) applying a filtering sequence to said sampled and digitized frame to obtain decomposition of the band of the radio frequency response signal into a plurality of frequency bands;
    e) producing a matrix of spectral coefficients containing the coefficients resulting from said filtering operation or coefficients deriving therefrom;
    f) determining, for at least some of the points of the sampled and digitized frame, respective interpolating polynomials which approximate the variation of said spectral coefficients in the various bands into which the radio frequency signal was decomposed;
    g) for said points, from the coefficients of the interpolating polynomial obtaining a local estimator, combining at least two coefficients of different orders of the interpolating polynomial with one another.

19. A method as claimed in claim 18, wherein the frequency bands into which said radio frequency signal is subdivided cover the entire frequency band of the signal.

20. A method as claimed in claim 18, wherein said frequency bands are bands of different width and position.

21. A method as claimed in claim 18, wherein said filtering operations are obtained using a time-frequency transform.

22. A method as claimed in claim 21, wherein said time-frequency transform is a wavelet.

23. A method as claimed in claim 21, wherein said time frequency transform is a Discrete Wavelet Packet Transform.

24. A method as claimed in claim 18, comprising the phase to determine statistical distribution of the local estimators and to create a set of classes of values capable of bi-univocally identifying homogeneous portions on the ultrasound frame of the investigated sample.

25. A method as claimed in claim 18, wherein color images produced using said local estimators are overlaid on an ultrasound image.

26. A method as claimed in claim 25, wherein said color images are produced selecting the local estimators that fall within classes of reference, bi-univocally related to predetermined tissue structures.

* * * * *